United States Patent
Wertz et al.

(10) Patent No.: US 10,947,454 B2
(45) Date of Patent: Mar. 16, 2021

(54) FLAME RETARDANT LEVULINIC ACID-BASED COMPOUNDS

(71) Applicant: International Business Machines Corporation, Armonk, NY (US)

(72) Inventors: Jason T. Wertz, Pleasant Valley, NY (US); Joseph Kuczynski, North Port, FL (US); Brandon M. Kobilka, Tucson, AZ (US); Scott B. King, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 15/728,536

(22) Filed: Oct. 10, 2017

(65) Prior Publication Data

US 2019/0106630 A1  Apr. 11, 2019

(51) Int. Cl.
*C09K 21/06* (2006.01)
*C08G 85/00* (2006.01)
*C08K 5/51* (2006.01)
*C09K 21/12* (2006.01)
*C08K 5/5313* (2006.01)
*C08G 59/30* (2006.01)
*C08K 5/5317* (2006.01)
*C08G 64/02* (2006.01)
*C08L 85/02* (2006.01)
*C08K 5/00* (2006.01)

(52) U.S. Cl.
CPC ............ *C09K 21/06* (2013.01); *C08G 59/304* (2013.01); *C08G 64/0258* (2013.01); *C08G 85/004* (2013.01); *C08K 5/51* (2013.01); *C08K 5/5313* (2013.01); *C08K 5/5317* (2013.01); *C08L 85/02* (2013.01); *C09K 21/12* (2013.01); *C08K 5/0066* (2013.01)

(58) Field of Classification Search
CPC ...... C08K 5/51; C08K 5/0066; C08K 5/5313; C08K 5/5317; C08G 85/004; C08G 59/304; C08G 64/0258
See application file for complete search history.

(56) References Cited

U.S. PATENT DOCUMENTS

| | | | | |
|---|---|---|---|---|
| 3,399,171 | A | * 8/1968 | Vogt | C07F 9/08 528/108 |
| 2008/0214708 | A1 | * 9/2008 | Bauer | C07F 9/301 524/147 |
| 2010/0124583 | A1 | * 5/2010 | Medoff | C12P 19/14 426/2 |
| 2015/0148499 | A1 | 5/2015 | Boday et al. | |
| 2015/0225510 | A1 | 8/2015 | Boday et al. | |
| 2015/0225511 | A1 | * 8/2015 | Boday | C08G 79/02 528/400 |
| 2016/0237352 | A1 | 8/2016 | Boday et al. | |
| 2016/0237353 | A1 | 8/2016 | Boday et al. | |

OTHER PUBLICATIONS

Liu et al., "Design, Synthesis, and Application of Novel Flame Retardants Derived From Biomass", BioResources, 2012, pp. 4914-4925.
Green et al., "Dimethyl Acetals", Protective Groups in Organic Synthesis, 1999, printed Jun. 29, 2017, 4 pages.

* cited by examiner

*Primary Examiner* — Monique R Peets
(74) *Attorney, Agent, or Firm* — Michael D. Purdham

(57) ABSTRACT

A flame retardant levulinic acid-based compound, a process for forming a levulinic acid-based flame retardant polymer, and an article of manufacture comprising a material that contains a flame retardant levulinic acid-based polymer are disclosed. The flame retardant levulinic acid-based compound has variable moieties, which include phenyl-substituted and/or R functionalized flame retardant groups. The process for forming the flame retardant polymer includes forming a phosphorus-based flame retardant molecule, forming a levulinic acid derivative, chemically reacting the phosphorus-based flame retardant molecule and the levulinic acid derivative to form a flame retardant levulinic acid-based compound, and incorporating the levulinic acid-based flame retardant compound into a polymer to form the flame retardant polymer.

8 Claims, 24 Drawing Sheets

200-2

212

216-1

216-2

216-3

216-4

216-5

216-6

X =  R  or  Ph  or  [216-9]  or  [216-10]
216-7  216-8  216-9  216-10

$M^1$ = 216-1 with X = 216-7, 216-8, 216-9, or 216-10

$M^2$ = 216-2 or 216-3

$M^3$ = 216-3 or 216-5 with X = 216-7, 216-8, 216-9, or 216-10

$M^4$ = 216-4 or 216-6 with X = 216-7, 216-8, 216-9, or 216-10

302

352  3-Mercaptopropionate 356  2-Mercaptoethanol

360  Cysteamine HCl

FLAME RETARDANT LEVULINIC ACID-BASED COMPOUNDS

BACKGROUND

The present disclosure relates to bio-renewable flame retardant compounds and, more specifically, to flame retardant levulinic acid-based compounds.

Bio-based, sustainable compounds can be used in the syntheses of substances that previously required petroleum-based raw materials. Examples of uses for bio-based compounds include polymers, flame retardants, cross-linkers, etc. There are numerous strategies for efficiently and inexpensively producing bio-based compounds on an industrial scale. Examples of these strategies can be found in fermentation technologies, membrane technologies, and genetic engineering. Levulinic acid (4-oxopentanoic acid) is one example of a bio-based compound that can have applications as a component of various polymers, resins, and small molecules. Levulinic acid can be produced by heating hexoses (e.g., glucose, fructose, etc.) or starches in dilute hydrochloric acid or sulfuric acid.

SUMMARY

Various embodiments are directed to flame retardant levulinic acid-based compounds. The flame retardant levulinic acid-based compounds can have variable moieties, which can include a phenyl-substituted flame retardant group, an R-functionalized flame retardant group, a methylene bridge group, a carbonyl group, a methine group with an ether-linked phenyl-substituted flame retardant group, a methine group with an ether-linked R-functionalized flame retardant group, a methyl group, a methylene bridge to an ether-linked phenyl-substituted flame retardant group, and a methylene bridge to an ether-linked R-functionalized flame retardant group. The R-functionalized flame retardant group can have functional groups such as allyl, epoxy, and propylene carbonate. Further, the flame retardant groups can include phosphonyl and/or phosphoryl moieties. The flame retardant levulinic acid-based compound can be incorporated into a polymer to form a flame retardant polymer.

Additional embodiments are directed to a process of forming a flame retardant levulinic acid-based polymer. The flame retardant levulinic acid-based polymer can be produced by forming a phosphorus-based flame retardant molecule, forming a levulinic acid derivative, chemically reacting the phosphorus-based flame retardant molecule and the levulinic acid derivative to form a flame retardant levulinic acid-based compound, and incorporating the levulinic acid-based flame retardant compound into a polymer to form the flame retardant polymer. The levulinic acid derivative can be synthesized from levulinic acid that comes from a bio-based source. The phosphorus-based flame retardant molecule can be a thiol, or a phosphorus-based molecule with allyl, epoxy, or phenyl groups. The flame retardant levulinic acid-based compound can have at least one functional group such as an allyl group, an epoxy group, a propylene carbonate group, a carboxylic acid group, an amine group, or a hydroxyl group. Additionally, the flame retardant levulinic acid-based compound can be incorporated into the polymer by blending, binding, or polymerizing.

Further embodiments are directed to an article of manufacture comprising a material that contains a flame retardant levulinic acid-based polymer. The article of manufacture can also contain an electronic component. Additionally, the material containing the flame retardant levulinic acid-based polymer can be a plastic for integrated circuit packing or an adhesive.

DETAILED DESCRIPTION

Figure 1:
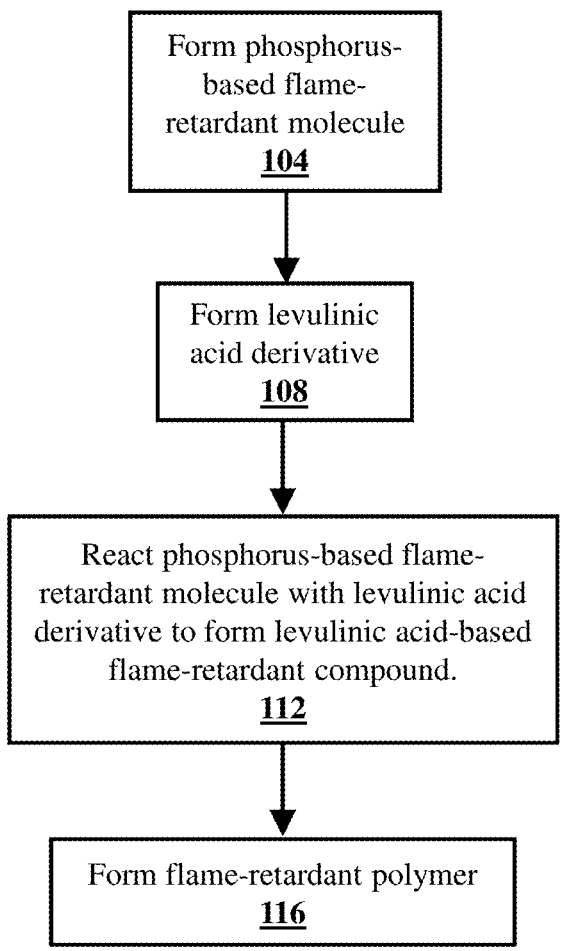
FIG. 1 is a flow diagram illustrating a process of forming a levulinic acid-based flame retardant polymer, according to some embodiments of the present disclosure.

Bio-based compounds are increasingly being used in the syntheses of substances that previously required petroleum-based raw materials. One benefit of bio-based compounds is that they are from renewable resources. Therefore, these compounds have applications in sustainable, or "green," materials. Sustainable materials are becoming more and more prevalent, due to the rising costs of fossil fuels, and increasing environmental regulatory controls. Advances in biotechnology have provided numerous strategies for efficiently and inexpensively producing bio-based compounds on an industrial scale. Examples of these strategies can be found in fermentation technologies, membrane technologies, and genetic engineering. Two approaches that use biotechnologies are plant-based and microorganism-based approaches. Plant-based approaches can involve obtaining a material directly from a plant, or growing plant tissues or cells that can produce bio-based compounds from various substrates using their own biosynthetic pathways. Microorganism-based approaches involve using native or genetically modified fungi, yeast, or bacteria to produce a desired compound from a structurally similar substrate.

Examples of uses for bio-based compounds include polymers, flame retardants, cross-linkers, etc. In some examples, bio-based polymers and petroleum-based polymers are blended to form a polymer composite. However, polymers can also be entirely bio-based, or produced from a combination of bio- and petroleum-based monomers. Bio-based compounds can impart flame retardant properties to bio- and petroleum-based polymers. For example, flame retardant molecules or cross-linkers can be incorporated into polymers. Additionally, flame retardant monomers can be polymerized to form flame retardant polymers.

Levulinic acid (4-oxopentanoic acid) is one example of a bio-based compound that can have applications as a component of various polymers, resins, and monomers. Levulinic acid can be produced by heating hexoses (e.g., glucose, fructose, etc.) or starches (e.g., corn starch, etc.) in dilute hydrochloric acid or sulfuric acid. Commercial production of levulinic acid can occur in a continuous manner using lignocellulose as a starting material, which is treated with dilute mineral acid and transferred to a high-pressure reactor where it is heated with steam to allow the formation of levulinic acid. After cooling and filtering off the solid by-products, the levulinic acid that is formed is separated from the mineral acid catalyst by extraction without neutralization of the acid catalyst. This allows the acid catalyst to be recycled, while the levulinic acid can be purified from the acid-free organic solvent. Pure levulinic acid is isolated by evaporation of the extraction solvent and distillation of the levulinic acid.

According to the present disclosure, levulinic acid is used as a precursor for flame retardant compounds. These compounds can include small molecules, cross-linkers, monofunctional molecules, and monomers. The levulinic acid-based flame retardant compounds can be added to polymers, fabrics, resins, or other materials during blending, curing, foaming, extrusion, or other processing techniques. In addition to directly adding the levulinic acid-based flame retardant monomers to the materials during processing, the added levulinic acid-based flame retardant monomers can be contained within microcapsules.

FIG. 1 is a flow diagram illustrating a process 100 of forming a flame retardant polymer containing a levulinic acid-based flame retardant compound, according to some embodiments of the present disclosure. Process 100 begins with the formation of a phosphorus-based flame retardant molecule. This is illustrated at step 104. The phosphorus-based flame retardant molecule has either a phosphoryl or a phosphonyl moiety (collectively referred to as an FR group) with an attached R functional group or phenyl (Ph) group. The R groups that are attached to the FR groups can vary, as is discussed in greater detail below. The phosphorus-based flame retardant molecules can be phosphate- or phosphonate-based flame retardant molecules. The structures and syntheses of phosphorus-based flame retardant molecules are discussed in greater detail with respect to FIGS. 3A-3D.

Process 100 continues with the formation of a levulinic acid derivative. This is illustrated at step 108. The derivatives can have one, two, or three hydroxyl groups to which phosphorus-based flame retardant molecules with allyl or epoxy functional groups can be bound. Examples of levulinic acid derivatives are discussed in greater detail with respect to FIGS. 4A-4B. It should be noted that the formation of the levulinic derivative in step 108 is illustrated as occurring after the formation of the phosphorus-based flame retardant molecule in step 104. However, in some embodiments, step 108 can occur before step 104. In some embodiments, steps 104 and 108 can occur simultaneously or can occur at overlapping times.

The levulinic acid derivative and the phosphorus-based flame retardant molecule are chemically reacted in order to form a levulinic acid-based flame retardant compound. This is illustrated at step 112. The identity of the levulinic acid-based flame retardant compound is determined by the levulinic acid derivative and the phosphorus-based flame retardant molecule used in the reaction. The FR groups are bonded to hydroxyl and/or carboxylic acid groups on the levulinic acid derivatives in a reaction with levulinic acid derivatives and the phosphorus-based flame retardant compounds. The syntheses and structures of levulinic acid-based flame retardant compounds are discussed in greater detail with respect to FIGS. 5A-5H and FIGS. 6A-6D.

The levulinic acid-based flame retardant compound formed in step 112 is polymerized, or added to another polymer, yielding a flame retardant levulinic acid-based polymer. This is illustrated at step 116. The levulinic acid-based flame retardant compounds can be added to a polymer as small molecules, cross-linkers, or bound monofunctional molecules. Further, the flame retardant levulinic acid-based compound can be polymerized in a reaction with a base and/or a second monomer. Additionally, in some embodiments, the flame retardant levulinic acid-based compound can be polymerized in a reaction with a Ziegler-Natta catalyst. Polymerization reactions with the flame retardant levulinic acid-based compounds are discussed in greater detail with respect to FIG. 7B.

Figure 2A:
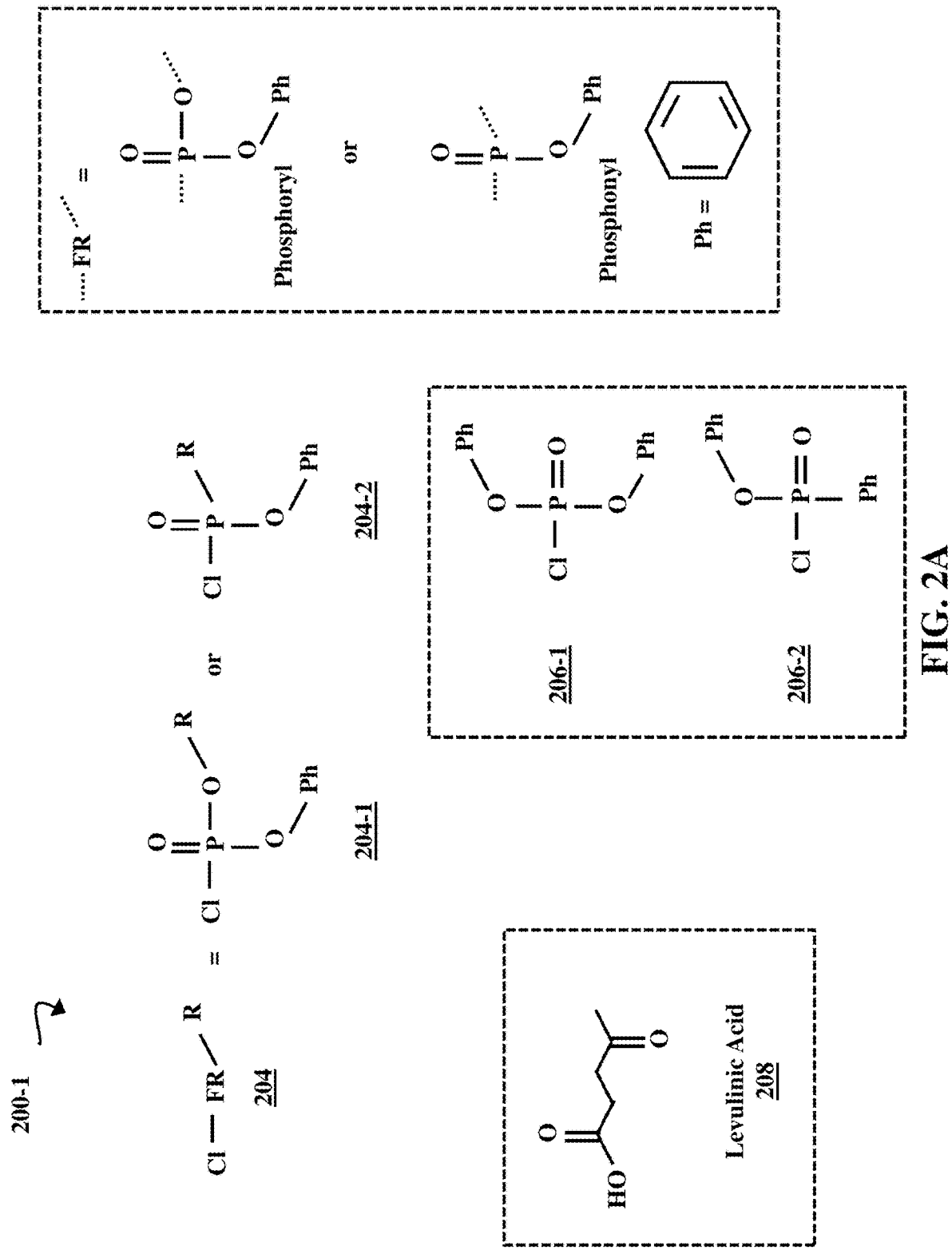
FIG. 2A is a diagrammatic representation of the molecular structures of R-functionalized phosphorus-based flame retardant molecules, phenyl-substituted flame retardant phosphorus-based flame retardant molecules, and levulinic acid, according to some embodiments of the present disclosure.

FIG. 2A is a diagrammatic representation 200-1 of the molecular structures of R-functionalized phosphorus-based flame retardant molecules 204-1 and 204-2 (referred to herein collectively as 204), phenyl-substituted phosphorus-based flame retardant molecules 206-1 and 206-2 (referred to collectively as 206), and levulinic acid 208, according to some embodiments of the present disclosure. Each phosphorus-based flame retardant molecule is either a phosphate-based flame retardant molecule 204-1 and 206-1 or phosphonate-based flame retardant molecule 204-2 and 206-2. Herein, phosphoryl and phosphonyl moieties in the phosphate- and phosphonate-based molecules, respectively, are replaced by the abbreviation "FR" in order to simplify illustrations of the molecular structures. The moieties replaced by the abbreviation each have a phenyl substituent. However, this phenyl can be replaced by another alkyl substituent (e.g., methyl, ethyl, propyl, and isopropyl, etc.).

The compounds referred to as phenyl-substituted flame retardant phosphorus-based flame retardant molecules 206, each have two phenyl (Ph) substituents. The compounds referred to as R-functionalized phosphorus-based flame retardant molecules 204 each have an R functional group in addition to a single phenyl (Ph) substituent. In some embodiments, the phenyl substituents are replaced by another alkyl substituent (e.g., methyl, ethyl, propyl, and isopropyl, etc.). Example syntheses of the R-functionalized phosphorus-based flame retardant molecules 204 are discussed with respect to FIGS. 3A and 3B. The phosphorus-based flame retardant molecules 204 and 206 are reacted with levulinic acid derivatives to form levulinic acid-based flame retardant compounds.

Herein, levulinic acid-based flame retardant compounds are referred to as R-functionalized (monofunctionalized, difunctionalized, or trifunctionalized) or phenyl-substituted. The terminal R groups attached to FR moieties (e.g., allyl, epoxy, and propylene carbonate) are involved in binding to polymer chains or in polymerization reactions, while the phenyl substituents on the FR moieties do not participate in these reactions. Therefore, any compound with at least one R functional group is referred to as R-functionalized to indicate that it can participate in binding or polymerization. Levulinic acid-based flame retardant compounds with only phenyl-substituents on their FR moieties cause a polymer to be flame retardant when blended into the polymer.

Figure 2B:
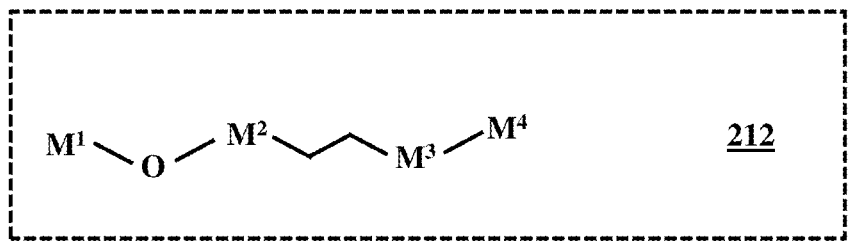
FIG. 2B is a diagrammatic representation of the molecular structure of a generic levulinic acid-based flame retardant compound.
Figure 2B:
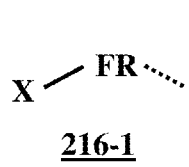
Figure 2B:
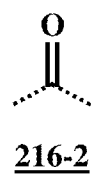
Figure 2B:
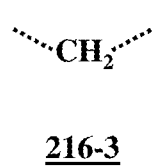
Figure 2B:
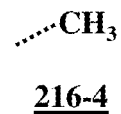
Figure 2B:
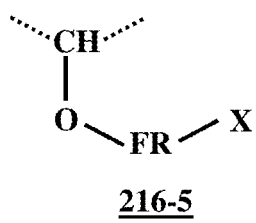
Figure 2B:
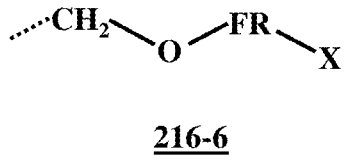
Figure 2B:
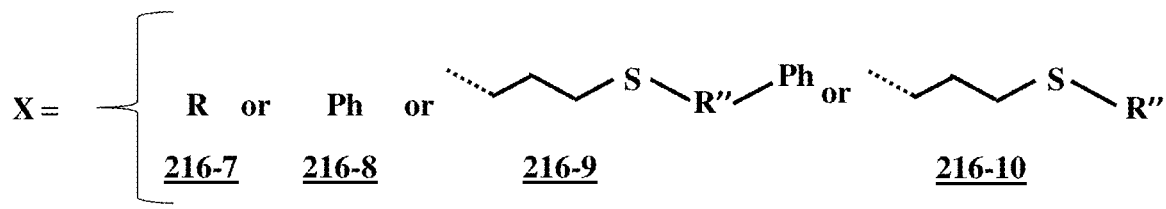

FIG. 2B is a diagrammatic representation 200-2 of the molecular structure of a generic levulinic acid-based flame retardant compound 212, according to some embodiments of the present disclosure. The levulinic acid-based flame retardant compound 212 has several variable positions, which are represented by "M" in the diagram. These positions can have functional groups (e.g., R groups) that will participate in polymerization reactions, or bind to polymers. The positions can also have substituents (e.g., phenyl (Ph) or other alkyl groups) that do not participate in binding or polymerization. When the levulinic acid-based flame retardant compound 212 has a single functional group, it can bind to polymer chains, or be polymerized. Further, when the levulinic acid-based flame retardant compound 212 has more than one functional group, it can bind to polymer chains, act as a cross-linker, or be polymerized. When the levulinic acid-based flame retardant compound 212 has no R groups to participate in binding or polymerization, it can be blended with a polymer as a flame retardant small molecule. These properties are discussed in greater detail below.

Additionally, examples of M moieties are illustrated in FIG. 2B. For example, $M^1$ is a flame retardant group 216-1 with an R-group functionalization (216-7), a phenyl-substituent (216-8), a thioether-linked phenyl-substituted flame retardant group (216-9), or a thioether-linked R-substituted flame retardant group (216-10); $M^2$ is either carbonyl group 216-2 or methylene bridge 216-3; $M^3$ is either carbonyl group 216-3 or a methine group with an ether-linked flame retardant group 216-5 with an R-group functionalization (216-7), a phenyl-substituent (216-8), a thioether-linked phenyl-substituted flame retardant group (216-9), or a thioether-linked R-substituted flame retardant group (216-10); and $M^4$ is either a methyl group 216-4, a methylene bridge to an ether-linked flame retardant group 216-5 with an R-group functionalization (216-7), a phenyl-substituent (216-8), a thioether-linked phenyl-substituted flame retardant group (216-9), or a thioether-linked R-substituted flame retardant group (216-10). While thioether-linked phenyl-substituted flame retardant group (216-9) and thioether-linked R-substituted flame retardant group (216-10) are depicted with three-carbon chains, chains of varying lengths (e.g., three to fourteen carbons, etc.) could be used. Specific examples of R functional groups and levulinic acid-based flame retardant compounds are discussed in greater detail below.

Figure 3A:
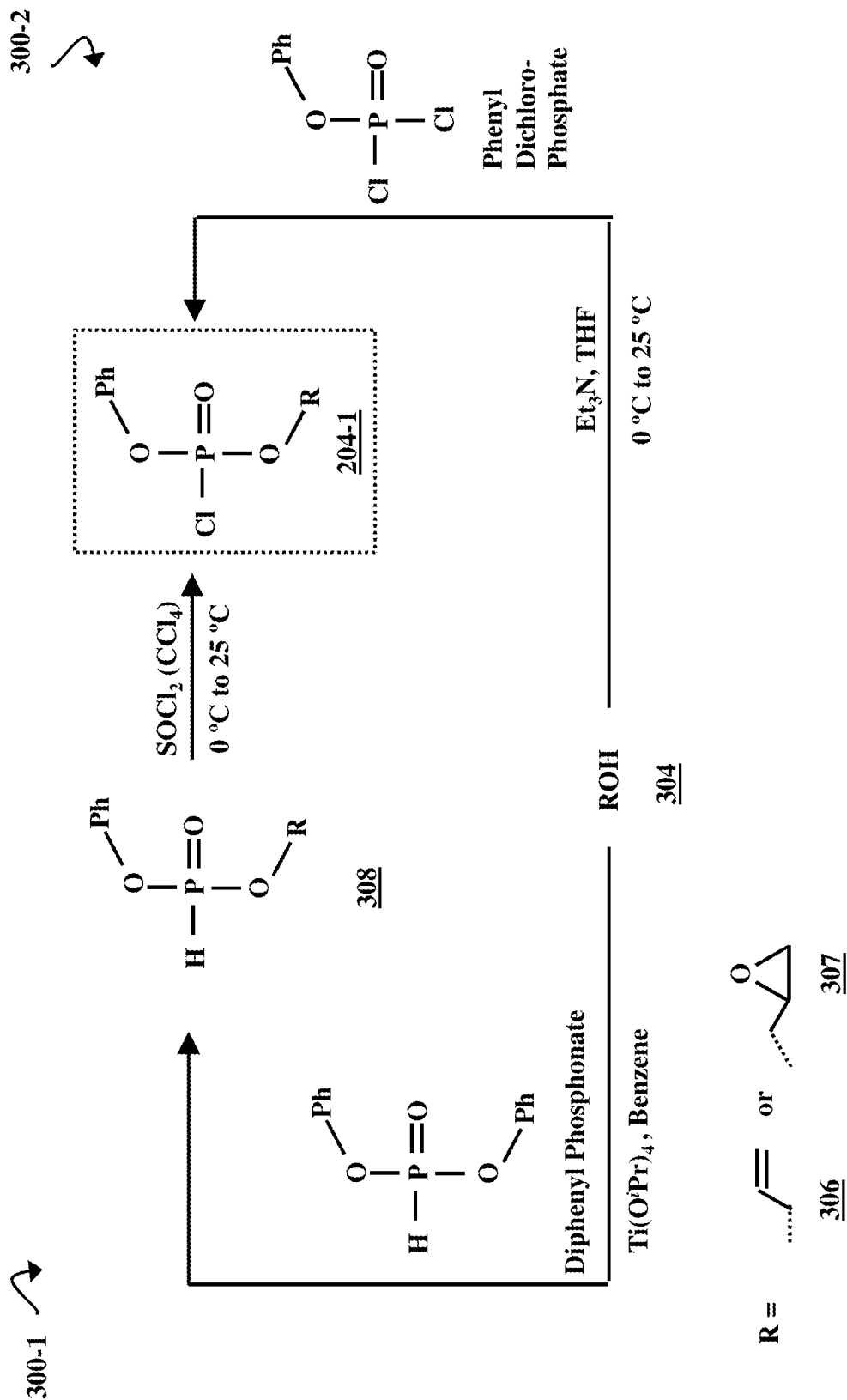
FIG. 3A is a chemical reaction diagram illustrating two processes of synthesizing an R-functionalized phosphate-based flame retardant molecule, according to some embodiments of the present disclosure.

FIG. 3A is a chemical reaction diagram illustrating two processes 300-1 and 300-2 of synthesizing an R-functionalized phosphate-based flame retardant molecule 204-1, according to some embodiments of the present disclosure. In both processes 300-1 and 300-2, an alcohol 304 is a starting material for the R-functionalized phosphate-based flame retardant molecule 204-1. The alcohol 304 has either an allyl R group 306 or an epoxy R group 307. It should be noted that, though an allyl group 306 with a single methylene spacer group is illustrated here, other alcohols with allylic chains of varying lengths (e.g., one to twelve methylene spacer groups, etc.) could be used. Additionally, alcohols with acrylate substituents are used in some embodiments.

In process 300-1, the alcohol 304 is reacted with diphenyl phosphonate and titanium isopropoxide (Ti(O$^i$Pr)$_4$) in benzene to produce a precursor 308 to the R-functionalized phosphate-based flame retardant molecule 204-1. In this pseudo-transesterification reaction, the precursor 308 is formed when a phenyl (Ph) substituent on diphenyl phosphonate is replaced by the R group from the alcohol 304. The precursor 308 is then reacted with thionyl chloride (SOCl$_2$) and carbon tetrachloride (CCl$_4$) over a range of approximately 0° C. to approximately room temperature (RT, e.g., 15-25° C.), forming the R-functionalized phosphate-based flame retardant molecule 204-1. In process 300-2, the alcohol 304 is reacted with phenyl dichlorophosphate in a tetrahydrofuran (THF) solution containing triethyl amine (Et$_3$N). This process is carried out over a range of approximately 0° C. to approximately room temperature (RT, e.g., 15-25° C.). A chloride on the phenyl dichlorophosphate is replaced by the alcohol 304, forming the R-functionalized phosphate-based flame retardant molecule 204-1.

Figure 3B:
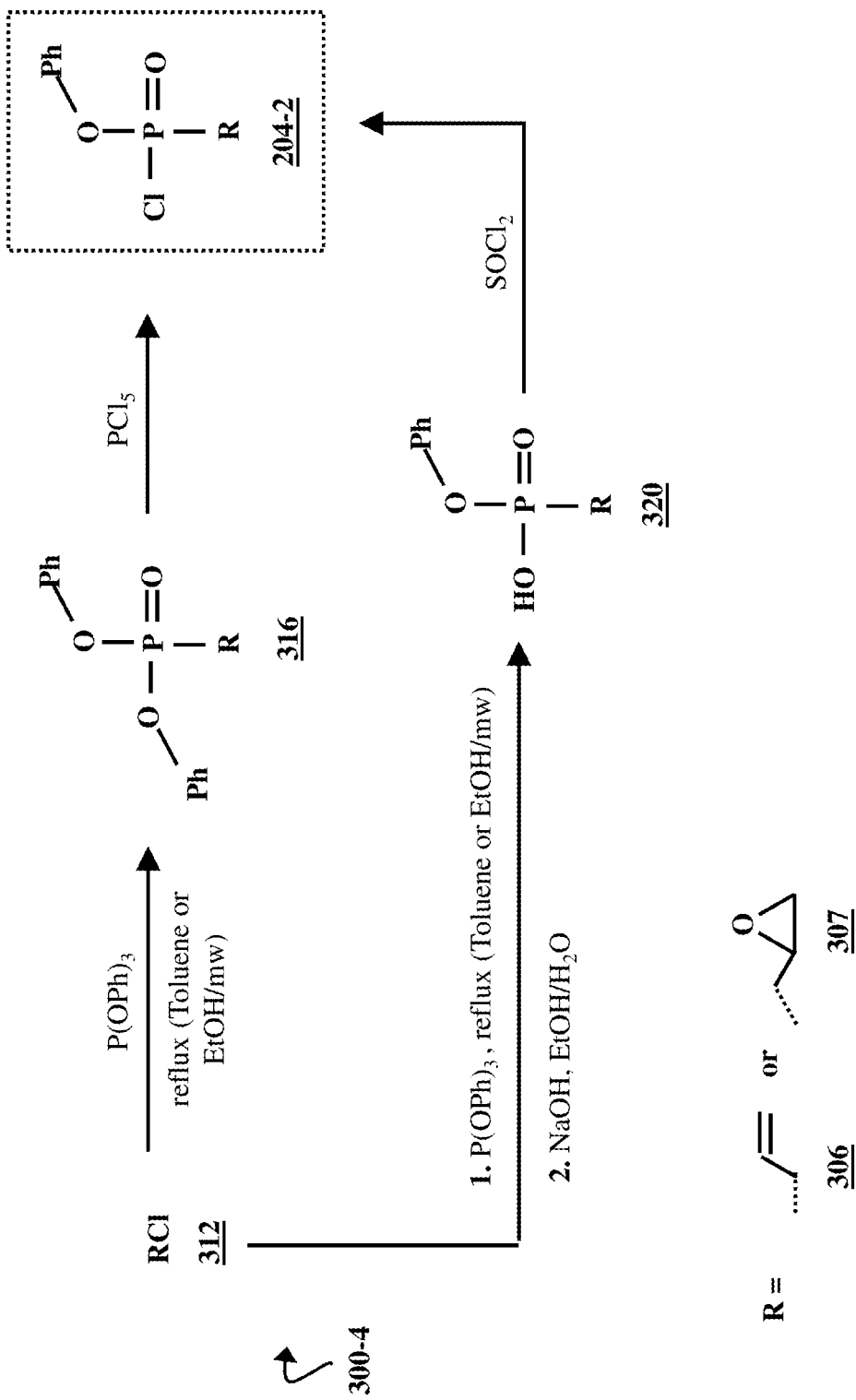
FIG. 3B is a chemical reaction diagram illustrating two processes of synthesizing an R-functionalized phosphonate-based flame retardant molecule, according to some embodiments of the present disclosure.

FIG. 3B is a chemical reaction diagram illustrating two processes 300-3 and 300-4 of synthesizing an R-functionalized phosphonate-based flame retardant molecule 204-2, according to some embodiments of the present disclosure. In both processes 300-3 and 300-4, an organochloride 312 is a starting material for the R-functionalized phosphonate-based flame retardant molecule 204-2. The organochloride 312 has either an allyl R group 306 or an epoxy R group 307. It should be noted that, as in the case of the alcohol 304, other organochlorides with allylic chains of varying lengths (e.g., one to twelve methylene spacer groups, etc.) could be used. Additionally, organochlorides with acrylate substituents are used in some embodiments.

In process 300-3, the organochloride 312 is reacted with triphenyl phosphite (P(OPh)$_3$). The mixture is heated, either by refluxing in toluene or microwaving (mw) in ethanol (EtOH), producing a phosphonyl ester precursor 316 to the R-functionalized phosphonate-based flame retardant molecule 204-2. The phosphonyl ester precursor 316 is reacted with phosphorus pentachloride (PCl$_5$) to form the R-functionalized phosphonate-based flame retardant molecule 204-2.

In process 300-4, a mixture of the organochloride 312 and triphenyl phosphite (P(OPh)$_3$) is heated, either by refluxing in toluene or microwaving (mw) in ethanol (EtOH), forming a phenylphosphinic acid precursor 320 to the R-functionalized phosphonate-based flame retardant molecule 204-2. The reaction is then quenched by raising the pH of the solution. In this prophetic example, an ethanol (EtOH)/water (H$_2$O) solution of sodium hydroxide (NaOH) is added to the reaction mixture. However, in some embodiments, bases other than sodium hydroxide, such as potassium hydroxide or lithium hydroxide, are used to quench the reaction. When the reaction has been quenched, thionyl chloride (SOCl$_2$) is added to the phenylphosphinic acid precursor 320, producing the R-functionalized phosphonate-based flame retardant molecule 204-2.

Figure 3C:
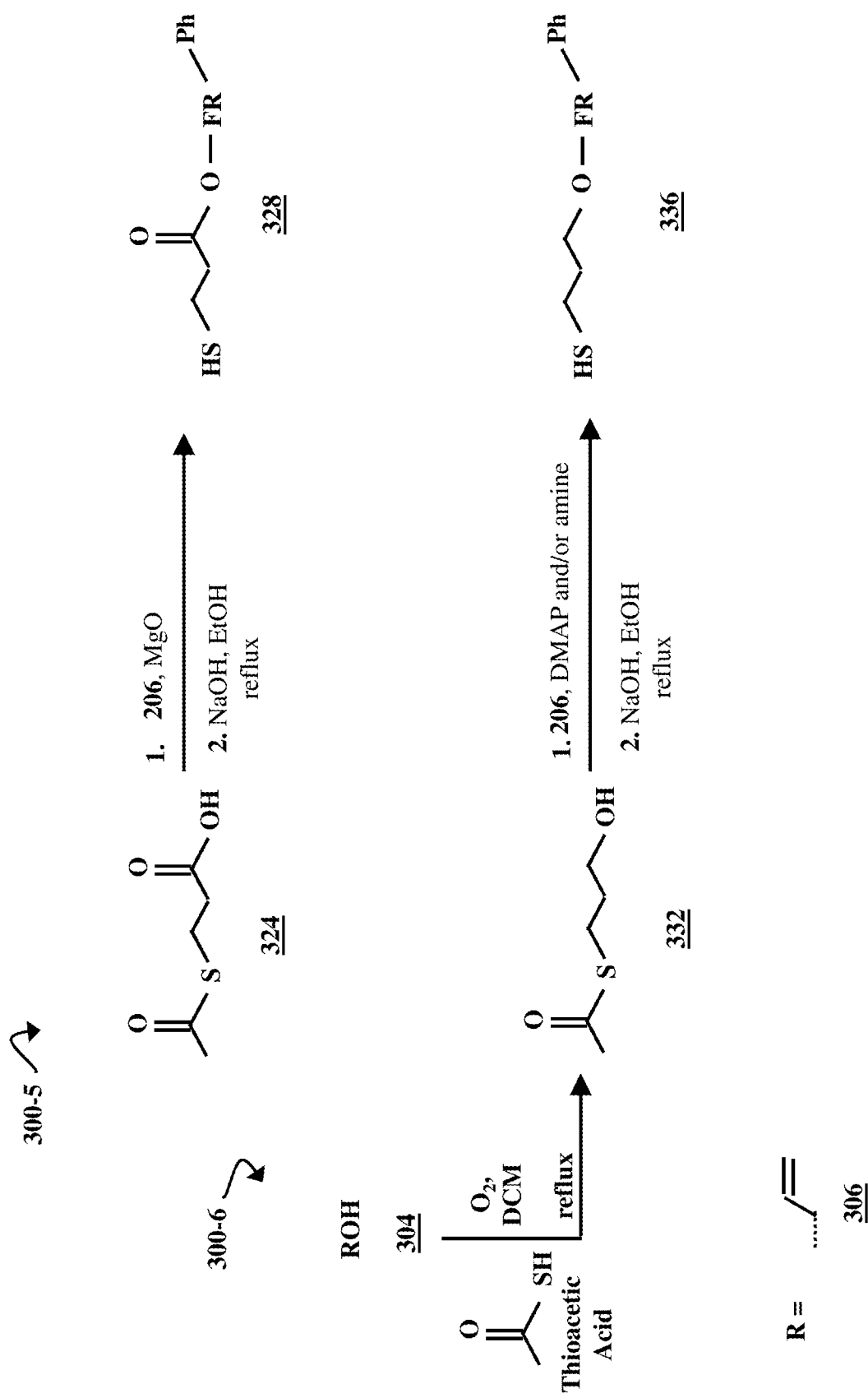
FIG. 3C is a chemical reaction diagram illustrating a process of synthesizing a carboxylic acid-derived flame retardant thiol molecule and a process of synthesizing a hydroxy-derived flame retardant thiol molecule, according to some embodiments of the present disclosure.

FIG. 3C is a chemical reaction diagram illustrating a process 300-5 of synthesizing a carboxylic acid-derived flame retardant thiol molecule 328 and a process 300-6 of synthesizing a hydroxy-derived flame retardant thiol molecule 336, according to some embodiments of the present disclosure. In process 300-5, acetate-protected thiopropionic acid 324 is reacted with magnesium oxide (MgO) and a phenyl-substituted phosphorus-based flame retardant compound 206 (either diphenyl chlorophosphate (DPCPa) 206-1 or diphenylphosphinic chloride (DPCPo) 206-2). The acetate group is then removed by refluxing the mixture in an ethanol (EtOH) solution containing sodium hydroxide (NaOH), yielding the carboxylic acid-derived flame retardant thiol molecule 328. If the process is carried out with DPCPa 206-1, the carboxylic acid-derived flame retardant thiol molecule 328 will have phosphoryl FR groups, and, if the reaction is carried out with DPCPo 206-2, the carboxylic acid-derived flame retardant thiol molecule 328 will have phosphonyl FR groups.

In process 300-6, the alcohol 304 with the allyl R group 306 is reacted with thioacetic acid in a thiol-ene reaction. In the first step of the reaction, oxygen (O$_2$) is added to a dichloromethane (DCM) solution of the allyl alcohol 304 and thioacetic acid. The mixture is refluxed, resulting in an acetate-protected mercaptopropanol 332. The second step in the reaction is a substitution reaction involving a phenyl-substituted phosphorus-based flame retardant compound 206 and catalytic dimethylaminopyridine (cat. DMAP), and/or a stoichiometric amount of an organic amine, such as triethylamine (NEt$_3$). The acetate group is removed by refluxing the mixture in an ethanol (EtOH) solution containing sodium hydroxide (NaOH). This step results in the production of the hydroxy-derived flame retardant thiol molecule 336. If the process is carried out with DPCPa 206-1, the hydroxy-derived flame retardant thiol molecule 336 will have phosphoryl FR groups, and, if the reaction is carried out with DPCPo 206-2, the hydroxy-derived flame retardant thiol molecule 336 will have phosphonyl FR groups.

Figure 3D:
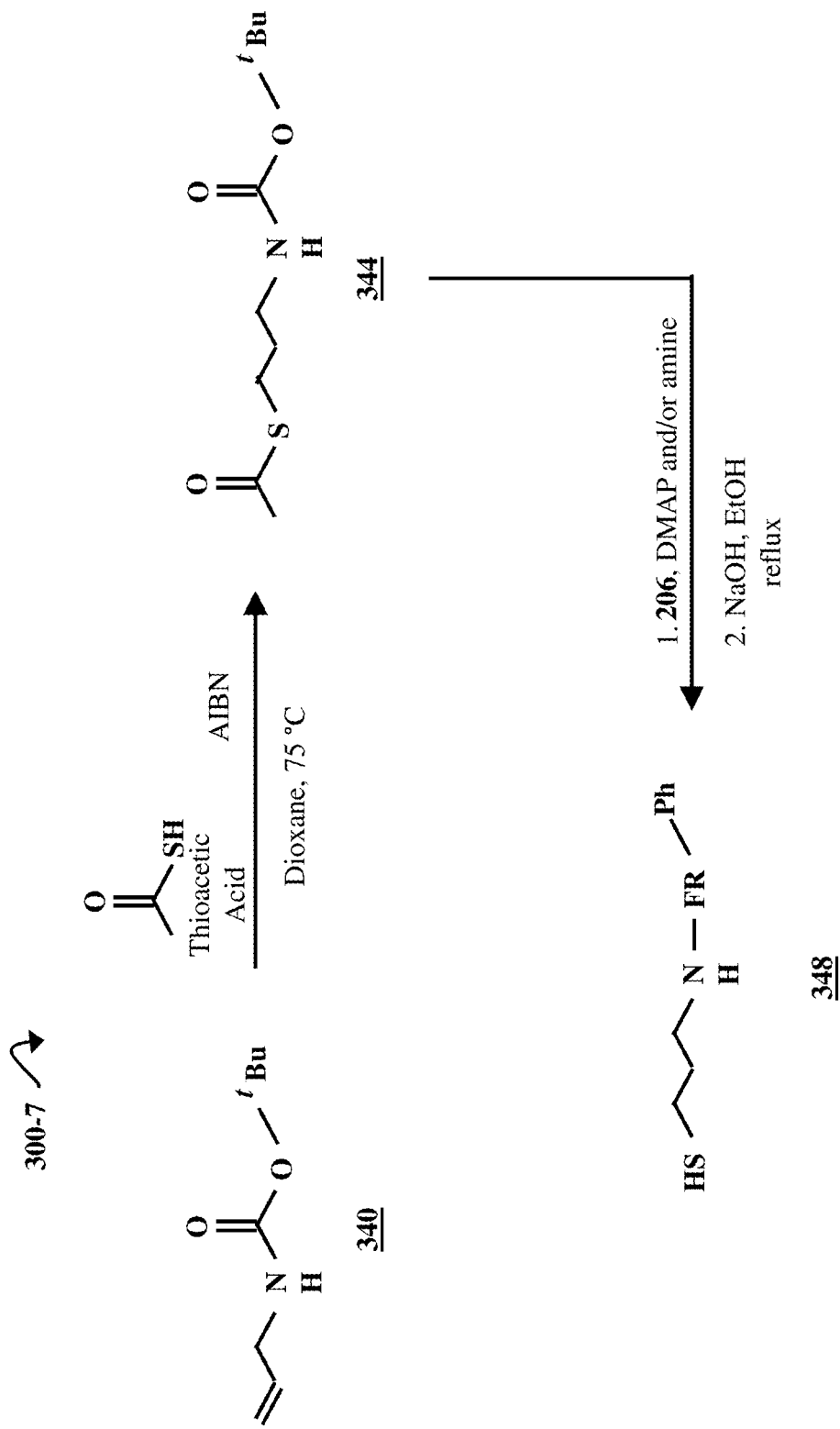
FIG. 3D is a chemical reaction diagram illustrating a process of synthesizing an amine-derived flame retardant thiol molecule, according to some embodiments of the present disclosure.

FIG. 3D is a chemical reaction diagram illustrating a process 300-7 of synthesizing an amine-derived flame retardant thiol molecule 348, according to some embodiments of the present disclosure. In process 300-7, 1-(boc-amino)-3-butene 340 is first reacted with thioacetic acid in a thiol-ene reaction. Azobisisobutyronitrile (AIBN) is added to the dioxane solution of 1-(boc-amino)-3-butene 340 and thioacetic acid, and the mixture is stirred at approximately 75° C., resulting in an acetate-protected precursor 344 to the amine-derived flame retardant thiol molecule 348. The second step in process 300-7 is a substitution reaction with a phenyl-substituted phosphorus-based flame retardant compound 206 and catalytic dimethylaminopyridine (cat. DMAP), and/or a stoichiometric amount of an organic amine, such as triethylamine (NEt$_3$). The acetate group and boc groups are removed under basic conditions (e.g., by refluxing the mixture in an ethanol (EtOH) solution containing sodium hydroxide (NaOH)). This step results in the production of the amine-derived flame retardant thiol molecule 348. If the process is carried out with DPCPa 206-1, the amine-derived flame retardant thiol molecule 348 will have phosphoryl FR groups, and, if the reaction is carried out with DPCPo 206-2, the amine-derived flame retardant thiol molecule 348 will have phosphonyl FR groups.

Figure 3E:
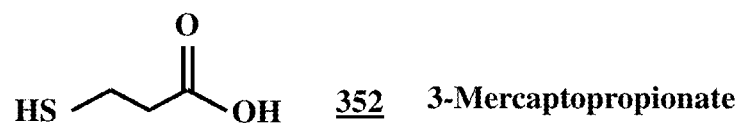
FIG. 3E is a diagrammatic representation of the molecular structures of three thiol molecules that are involved in the synthesis of levulinic acid-based compounds, according to some embodiments of the present disclosure.
Figure 3E:
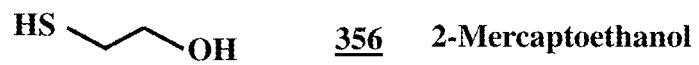
Figure 3E:
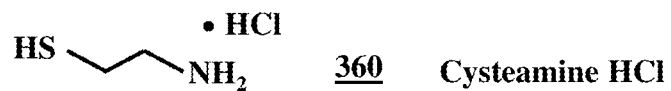

FIG. 3E is a diagrammatic representation of the molecular structures 302 of three thiol molecules that are involved in the synthesis of the levulinic acid-based compounds, according to some embodiments of the present disclosure. The three thiol molecules are 3-mercaptopropionate 352, 2-mercaptoethanol 356, and cysteamine hydrochloride (HCl) 360. Each of these thiols can provide a thioether with an R functional group in the synthesis of a functionalized thioether-linked flame retardant levulinic acid-based compound. The syntheses and structures of the functionalized thioether-linked flame retardant levulinic acid-derived compounds are discussed in greater detail with respect to FIGS. 6B and 6D.

Figure 4A:
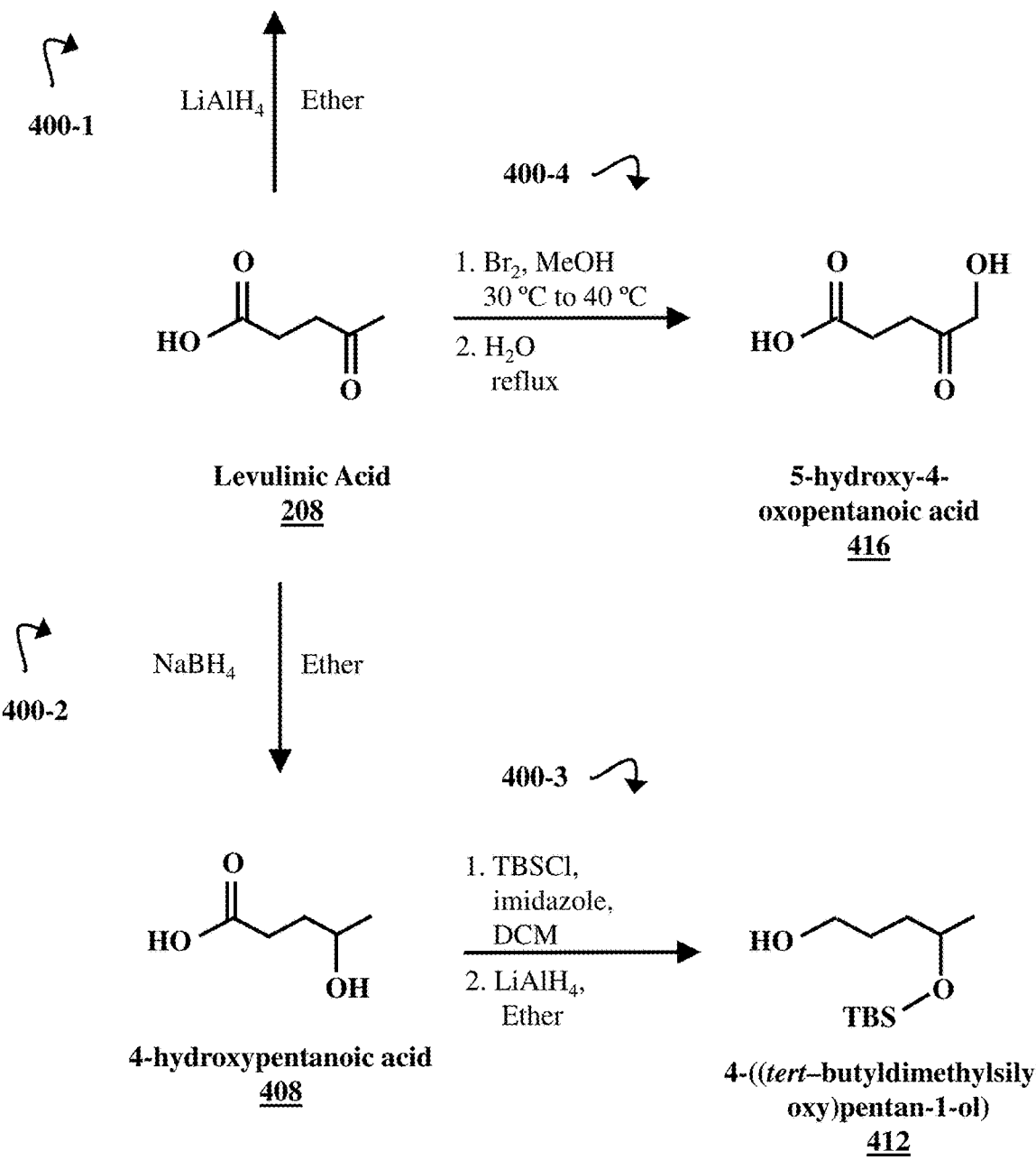
FIG. 4A is chemical reaction diagram illustrating processes of synthesizing the levulinic acid-derived compounds pentane-1,4-diol, 4-hydroxypentanoic acid, 4-((tert-butyldimethylsilyl)oxy)pentan-1-ol), and 5-hydroxy-4-oxopentanoic acid, according to some embodiments of the present disclosure.

FIG. 4A is chemical reaction diagram illustrating processes 400-1, 400-2, 400-3, and 400-4 of synthesizing the levulinic acid-derived compounds pentane-1,4-diol 404, 4-hydroxypentanoic acid 408, 4-((tert-butyldimethylsilyl) oxy)pentan-1-ol) 412, and 5-hydroxy-4-oxopentanoic acid 416, according to some embodiments of the present disclosure. In process 400-1, levulinic acid 208 is reduced by lithium aluminum hydride (LiAlH$_4$) in ether. This reduction reaction produces the pentane-1,4-diol 404. In process 400-2, levulinic acid 208 is reacted with sodium borohydride (NaBH$_4$) in ether. This reaction produces 4-hydroxypentanoic acid 408. In process 400-3, 4-hydroxypentanoic acid 408 is protected with a tert-butyldimethylsilyl (TBS) group, and its carboxylic acid group reduced to give 4-((tert-butyldimethylsilyl)oxy)pentan-1-ol 412. To do so, 408 4-hydroxypentanoic acid is reacted with tert-butyldimethylsilyl chloride (TBSCl) and imidazole in DCM. Then the resulting product is reduced by lithium aluminum hydride (LiAlH$_4$) in ether to give 4-((tert-butyldimethylsilyl)oxy)pentan-1-ol 412. In process 400-4, levulinic acid 208 is reacted with molecular bromine (Br$_2$) in methanol (MeOH). This process is carried out over a temperature range of approximately 30° C. to approximately 40° C. The product from the first step is refluxed in water in the second step in the reaction. This step produces 5-hydroxy-4-oxopentanoic acid 416.

Figure 4B:
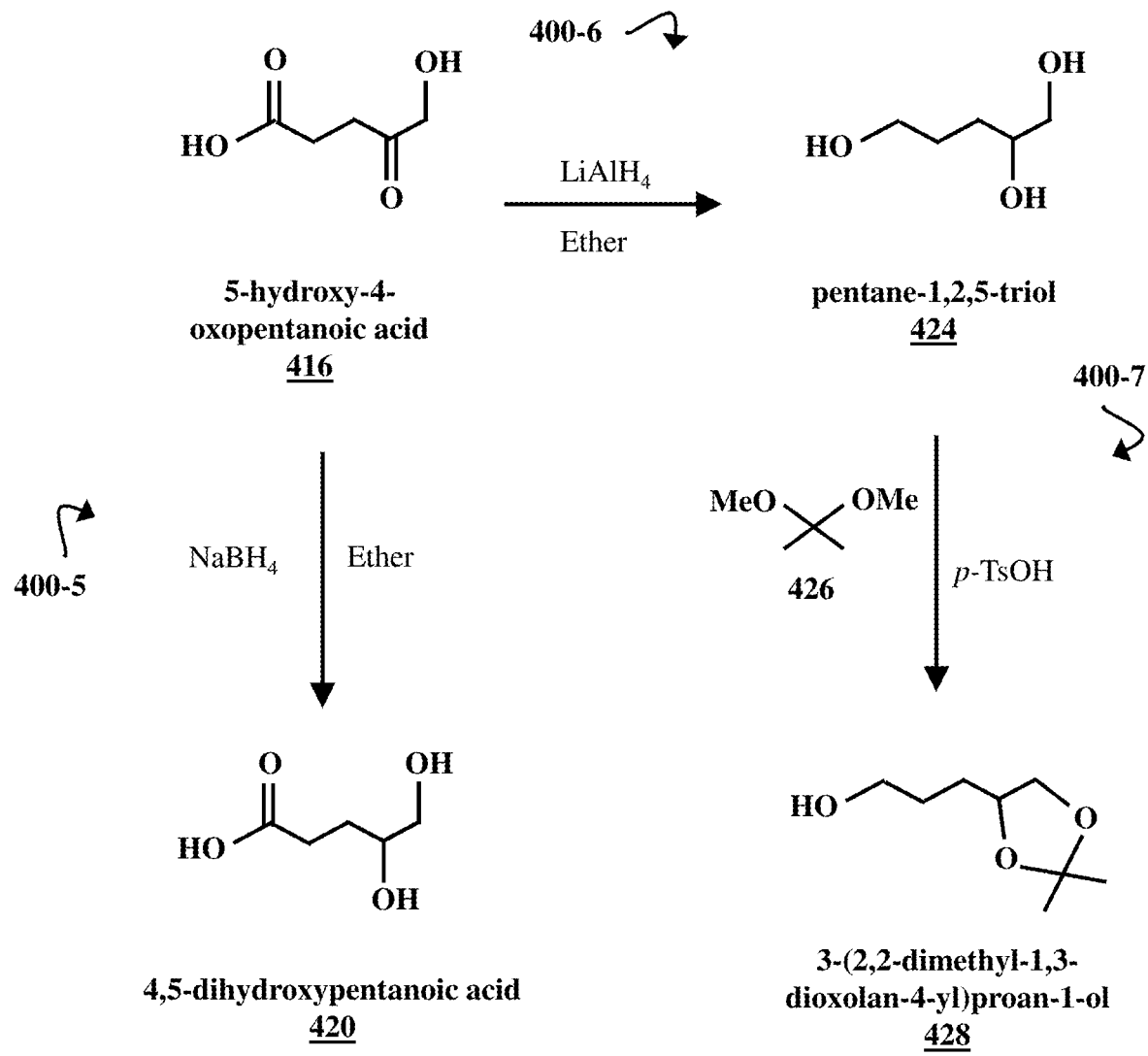
FIG. 4B is a chemical reaction diagram illustrating processes of synthesizing 5-hydroxy-4-oxopentanoic acid-derived 4,5-dihydroxypentanoic acid, pentane-1,2,5-triol, and 3-(2,2-dimethyl-1,3-dioxolan-4-yl)propan-1-ol, according to some embodiments of the present disclosure.

FIG. 4B is a chemical reaction diagram illustrating processes 400-5, 400-6, and 400-7 of synthesizing 5-hydroxy-4-oxopentanoic acid-derived 4,5-dihydroxypentanoic acid 420, pentane-1,2,5-triol 424, and 3-(2,2-dimethyl-1,3-dioxolan-4-yl)propan-1-ol 428, according to some embodiments of the present disclosure. In process 400-5, 5-hydroxy-4-oxopentanoic acid 416 is reacted with NaBH$_4$ in ether. This reaction produces 4,5-dihydroxypentanoic acid 420. In process 400-6, 5-hydroxy-4-oxopentanoic acid 416 is reduced by LiAlH$_4$ in ether. This reduction reaction produces pentane-1,2,5-triol 424. In process 400-7, pentane-1,2,5-triol 424 is reacted with 2,2-dimethoxypropane 426 and p-toluenesulfonic acid to produce 3-(2,2-dimethyl-1,3-dioxolan-4-yl)propan-1-ol 428.

Figure 5A:
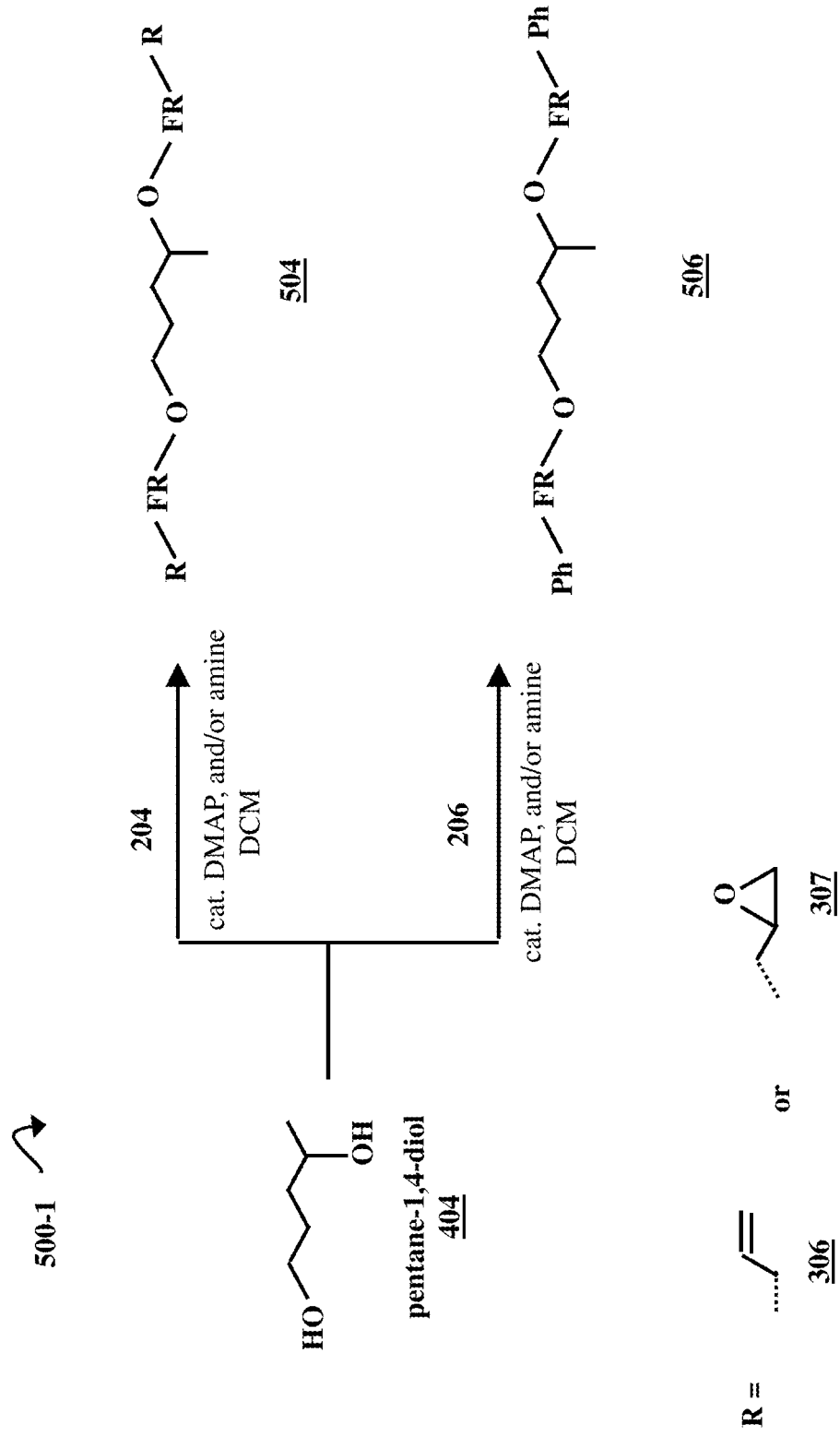
FIG. 5A is a chemical reaction diagram illustrating a process of forming a difunctionalized pentane-1,4-diol-based flame retardant compound and a phenyl-substituted pentane-1,4-diol-based flame retardant compound, according to some embodiments of the present disclosure.

FIG. 5A is a chemical reaction diagram illustrating a process 500-1 of forming a difunctionalized pentane-1,4-diol-based flame retardant compound 504 and a phenyl-substituted pentane-1,4-diol-based flame retardant compound 506, according to some embodiments of the present disclosure. In both reactions, pentane-1,4-diol 404 is reacted with a phosphorus-based flame-retardant molecule 204 or 206 and catalytic dimethylaminopyridine (cat. DMAP) in a dichloromethane (DCM) solution. When the reaction is carried out with an R-functionalized phosphorus-based compound 204, allyl-306 or epoxy-307 functionalized FR moieties are attached at the hydroxyl groups on pentane-1,4-diol 404. This reaction forms a difunctionalized pentane-1,4-diol-based flame retardant compound 504. This compound 504 is a flame retardant levulinic acid-based compound that can be polymerized, or act as a cross-linker in another polymer. Its inclusion in a polymer, either by polymerization or cross-linking, causes the polymer to be flame retardant.

If the reaction 500-1 is carried out with a phenyl-substituted phosphorus based compound 206, phenyl-substituted FR moieties are attached at the hydroxyl groups, and the phenyl-substituted pentane-1,4-diol-based flame retardant compound 506 is formed. This compound 506 is a flame retardant levulinic acid-based small molecule, which can be blended with a polymer to add flame retardancy to the polymer. It should be noted that reactions with phosphorus-based flame retardant molecules 204 and/or 206 and DMAP and/or a stoichiometric amount of an organic amine (such as triethylamine (NEt$_3$)), in a DCM solution can attach FR moieties to hydroxyl groups on any of the levulinic acid-based compounds disclosed herein that have hydroxyl groups (e.g., compounds 408, 412, 416, 420, 424, and 428). Further, it should be noted that an epoxy R group can be produced by reacting an allyl functional group 306 with a peroxide reagent, such as meta-chloroperoxybenzoic acid (mCPBA). Further, epoxy R groups 307 can ring open in reactions involving nucleophiles.

Figure 5B:
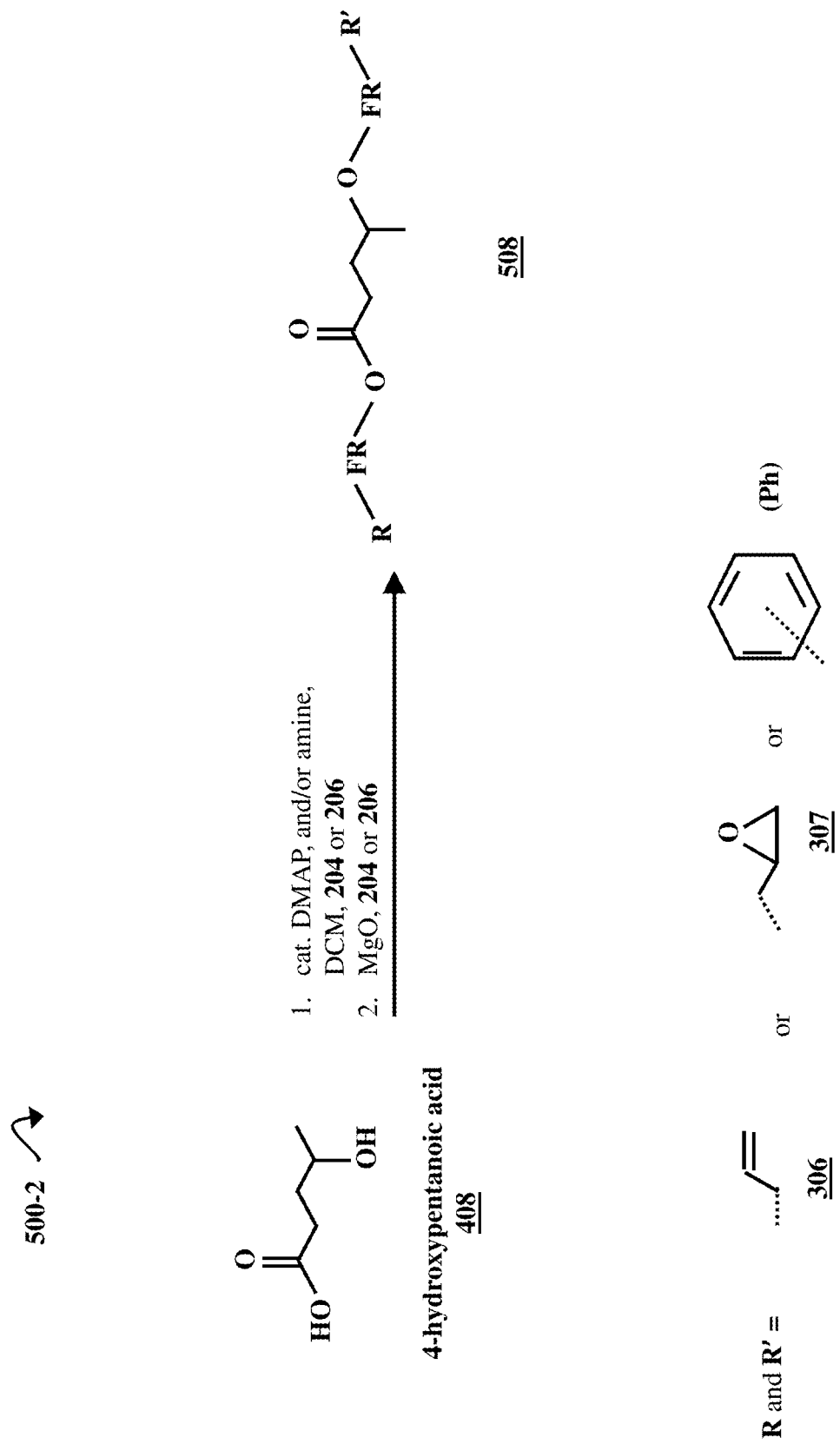
FIG. 5B is a chemical reaction diagram illustrating a process of forming R-functionalized and/or phenyl-substituted 4-hydroxypentanoic acid-derived flame retardant compounds, according to some embodiments of the present disclosure.

FIG. 5B is a chemical reaction diagram illustrating a process 500-2 of forming R-functionalized and/or phenyl-substituted 4-hydroxypentanoic acid-derived flame retardant compounds 508, according to some embodiments of the present disclosure. In this reaction, 4-hydroxypentanoic acid 408 is reacted with a phosphorus-based flame-retardant molecule 204 or 206 in two steps. Carrying out the reaction in multiple steps with different phosphorus-based flame-retardant molecules 204 or 206 allows the formation of monofunctionalized, difunctionalized, or phenyl-substituted 4-hydroxypentanoic acid-derived flame retardant compounds 508. In the first step, an FR moiety with a functional group or phenyl (Ph) substituent represented by R' is added at the location of the hydroxyl group, and in the second step, FR moieties with functional groups or phenyl (Ph) substituents represented by R are added at the location of the carboxylic acid group.

In the first step, the selected phosphorus-based flame-retardant molecule 204 or 206 is reacted with 4-hydroxypentanoic acid 408 and catalytic dimethylaminopyridine (cat. DMAP) and/or a stoichiometric amount of an organic amine (such as triethylamine (NEt$_3$)), in a dichloromethane (DCM) solution. These reaction conditions cause the phosphorus-based flame retardant molecule 204 or 206 to react with the hydroxyl group on 4-hydroxypentanoic acid 408, and attach an FR moiety. In the second step, the selected phosphorus-based flame-retardant molecule 204 or 206 is reacted with the product from the first step and magnesium oxide (MgO). These reaction conditions cause the phosphorus-based flame retardant molecule 204 or 206 to react with the carboxylic acid group on the product from the first step (and originally from 4-hydroxypentanoic acid 408), and attach an FR moiety. Carrying out the syntheses of the 4-hydroxypentanoic acid-derived flame retardant compounds 508 in multiple steps allows the identity of the R and R' groups and the degree of functionality to be varied.

For example, if steps one and two are both carried out with a phenyl-substituted phosphorus-based flame retardant molecule 206, compound 508 will be a phenyl-substituted flame retardant small molecule that can be blended with materials such as polymers to impart flame retardancy. Further, if steps one and two are both carried out with an R-functionalized flame-retardant phosphorus-based molecule 204, compound 508 will be a difunctionalized flame retardant compound that can be a cross-linker in a polymer, or it can be polymerized to form a flame retardant polymer. The functional R or R' groups on the phosphorus-based molecule 204 can be varied between steps one and two, yielding a difunctionalized compound with different types of functional groups (e.g., one allyl R group 306 and one epoxy R' group 307).

In additional examples, if step one is carried out with a phenyl-substituted phosphorus-based flame retardant molecule 206, and step two is carried out with an R-functionalized phosphorus-based flame retardant molecule 204, compound 508 will be a monofunctionalized flame retardant compound where the R group is an allyl 306 or epoxy 307 functional group (depending on the choice of R group on compound 204), and where the R' group is a phenyl substituent. Further, carrying out step one with an R-functionalized phosphorus-based flame retardant molecule 204, and step two with a phenyl-substituted phosphorus-based flame retardant molecule 206, yields a monofunctionalized flame retardant compound 508 with the functionalization occurring at the R' site within flame retardant compound 508. Monofunctionalized flame retardant compounds 508 can be polymerized, or bound to polymer chains, causing the polymer to be flame retardant.

Figure 5C:
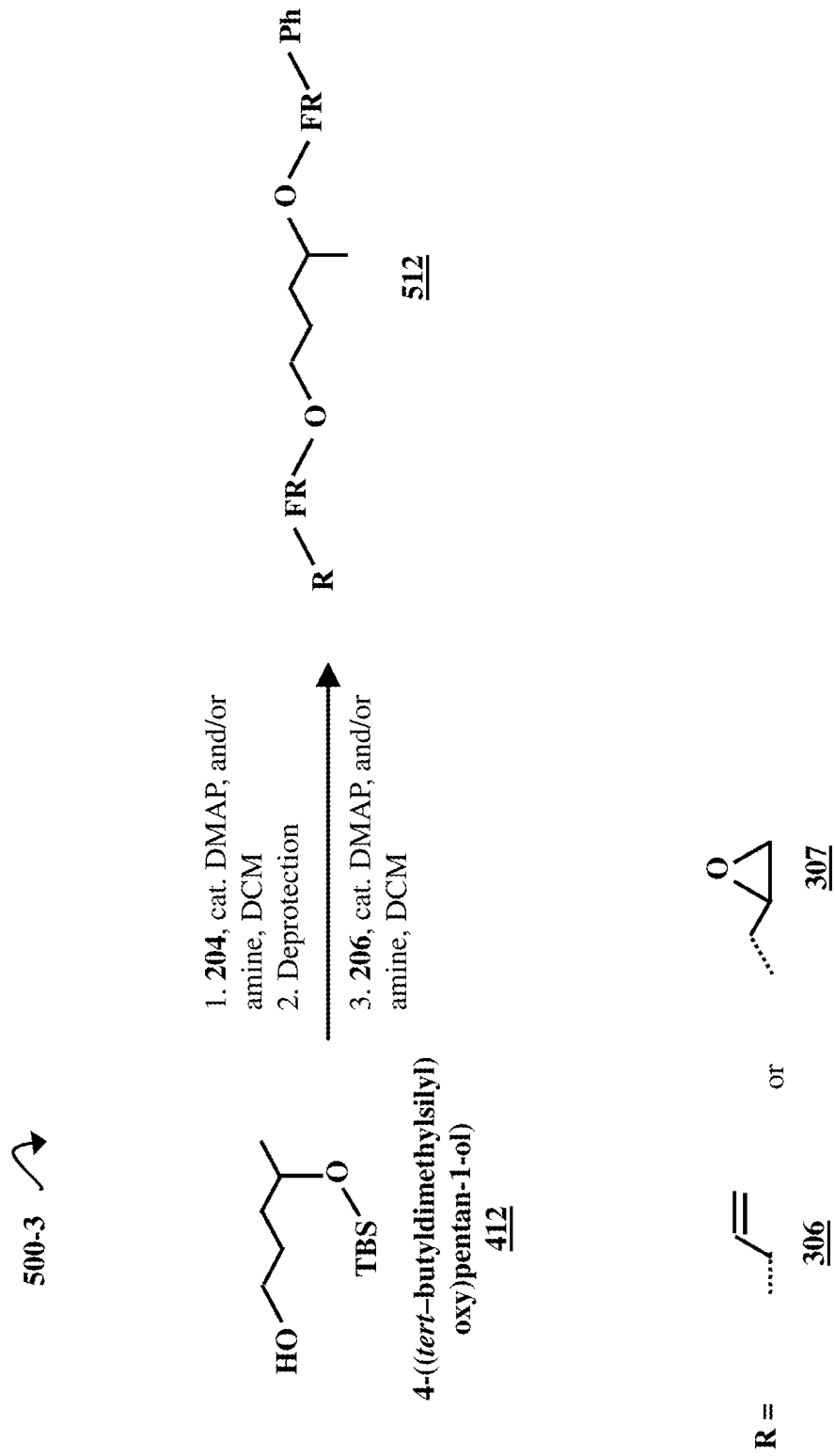
FIG. 5C is a chemical reaction diagram illustrating a process of forming a monofunctionalized 4-((tert-butyldimethylsilyl)oxy)pentan-1-ol-derived flame retardant compound, according to some embodiments of the present disclosure.

FIG. 5C is a chemical reaction diagram illustrating a process 500-3 of forming a monofunctionalized 4-((tert-butyldimethylsilyl)oxy)pentan-1-ol-derived flame retardant compound 512, according to some embodiments of the present disclosure. Process 500-3 is carried out in three steps. In the first step, levulinic acid-derived 4-((tert-butyldimethylsilyl)oxy)pentan-1-ol 412 is reacted with an R-functionalized phosphorus-based compound 204 and catalytic dimethylaminopyridine (cat. DMAP) and/or a stoichiometric amount of an organic amine (such as triethylamine (NEt$_3$)), in dichloromethane (DCM). This step attaches an R-functionalized FR moiety at the hydroxyl group on 4-((tert-butyldimethylsilyl)oxy)pentan-1-ol 412.

The second step is a deprotection reaction. In this step, tetra-n-butylammonium fluoride (TBAF) in THF is added to the reaction mixture. This deprotection exposes a secondary hydroxyl group, which is then reacted in the third step with a phenyl-substituted phosphorus-based compound 206 and cat. DMAP and/or a stoichiometric amount of an organic amine (such as triethylamine (NEt$_3$)), in DCM. The third step attaches a phenyl-substituted FR moiety to the newly exposed hydroxyl group, and forms the monofunctionalized 4-((tert-butyldimethylsilyl)oxy)pentan-1-ol-derived flame retardant compound 512. In some embodiments, the phenyl-substituted flame retardant phosphorus-based compound 206 could be used in step one and the R-functionalized flame retardant phosphorus based compound 204 could be used in step two, producing a monofunctionalized compound with the R and Ph groups in the opposite positions.

Figure 5D:
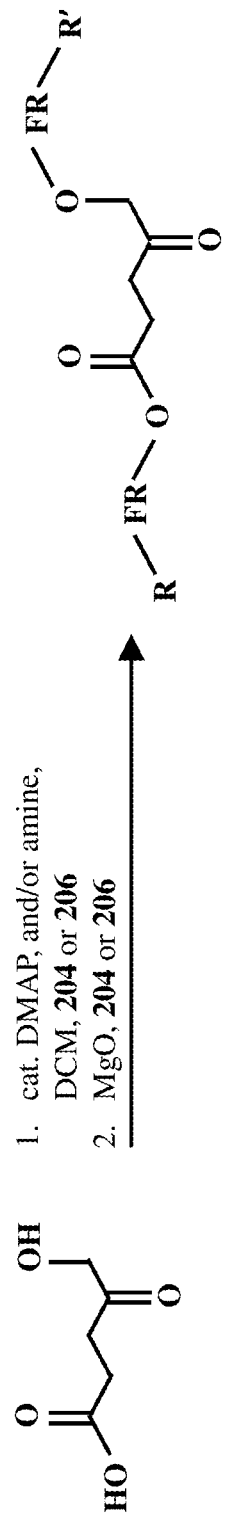
FIG. 5D is a chemical reaction diagram illustrating a process of forming R-functionalized and/or phenyl-substituted 5-hydroxy-4-oxopentanoic acid-derived flame retardant compounds, according to some embodiments of the present disclosure.
Figure 5D:
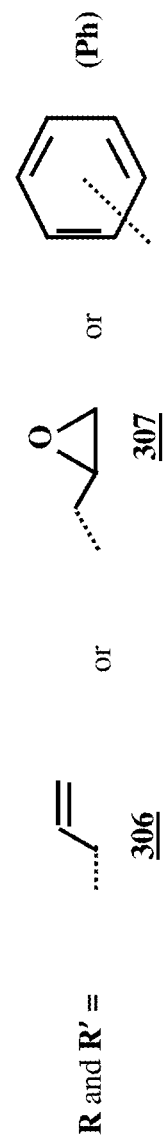

FIG. 5D is a chemical reaction diagram illustrating a process 500-4 of forming R-functionalized and/or phenyl-substituted 5-hydroxy-4-oxopentanoic acid-derived flame retardant compounds 516, according to some embodiments of the present disclosure. In this reaction, 5-hydroxy-4-oxopentanoic acid 416 is reacted with a phosphorus-based flame-retardant molecule 204 or 206 in two steps. Similar to process 500-2, carrying out the reaction in multiple steps with different phosphorus-based flame-retardant molecules 204 or 206 allows the formation of monofunctionalized, difunctionalized, or phenyl-substituted 5-hydroxy-4-oxopentanoic acid-derived flame retardant compounds 516. In the first step, an FR moiety with a functional group or phenyl (Ph) substituent represented by R' is added at the location of the hydroxyl group, and in the second step, FR moieties with functional groups or phenyl (Ph) substituents represented by R are added at the location of the carboxylic acid group.

In the first step, the selected phosphorus-based flame-retardant molecule 204 or 206 is reacted with 5-hydroxy-4-oxopentanoic acid 416 and catalytic dimethylaminopyridine (cat. DMAP) and/or a stoichiometric amount of an organic amine (such as triethylamine (NEt$_3$)), in a dichloromethane (DCM) solution. These reaction conditions cause the phosphorus-based flame retardant molecule 204 or 206 to react with the hydroxyl group on 5-hydroxy-4-oxopentanoic acid 416, and attach an FR moiety. In the second step, the selected phosphorus-based flame-retardant molecule 204 or 206 is reacted with the product from the first step and magnesium oxide (MgO). These reaction conditions cause the phosphorus-based flame retardant molecule 204 or 206 to react with the carboxylic acid group on the product from the first step (and originally from 5-hydroxy-4-oxopentanoic acid 416), and attach an FR moiety. Carrying out the syntheses of the 5-hydroxy-4-oxopentanoic acid-derived flame retardant compounds 508 in multiple steps allows the identity of the R and R' groups and the degree of functionality to be varied.

For example, if steps one and two are both carried out with a phenyl-substituted phosphorus-based flame retardant molecule 206, compound 516 will be a phenyl-substituted flame retardant small molecule that can be blended with materials such as polymers to impart flame retardancy. Further, if steps one and two are both carried out with an R-functionalized flame-retardant phosphorus-based molecule 204, compound 516 will be a difunctionalized flame retardant compound that can be a cross-linker in a polymer, or it can be polymerized to form a flame retardant polymer. The functional R or R' groups on the phosphorus-based molecule 204 can be varied between steps one and two, yielding a difunctionalized compound with different types of functional groups (e.g., one allyl R group 306 and one epoxy R' group 307).

In additional examples, if step one is carried out with a phenyl-substituted phosphorus-based flame retardant molecule 206, and step two is carried out with an R-functionalized phosphorus-based flame retardant molecule 204, compound 516 will be a monofunctionalized flame retardant compound where the R group is an allyl 306 or epoxy 307 functional group (depending on the choice of R group on compound 204), and where the R' group is a phenyl substituent. Further, carrying out step one with an R-functionalized phosphorus-based flame retardant molecule 204, and step two with a phenyl-substituted phosphorus-based flame retardant molecule 206, yields a monofunctionalized flame retardant compound 516 with the functionalization occurring at the R' site within flame retardant compound 516. Monofunctionalized flame retardant compounds 516 can be polymerized, or bound to polymer chains, causing the polymer to be flame retardant.

Figure 5E:
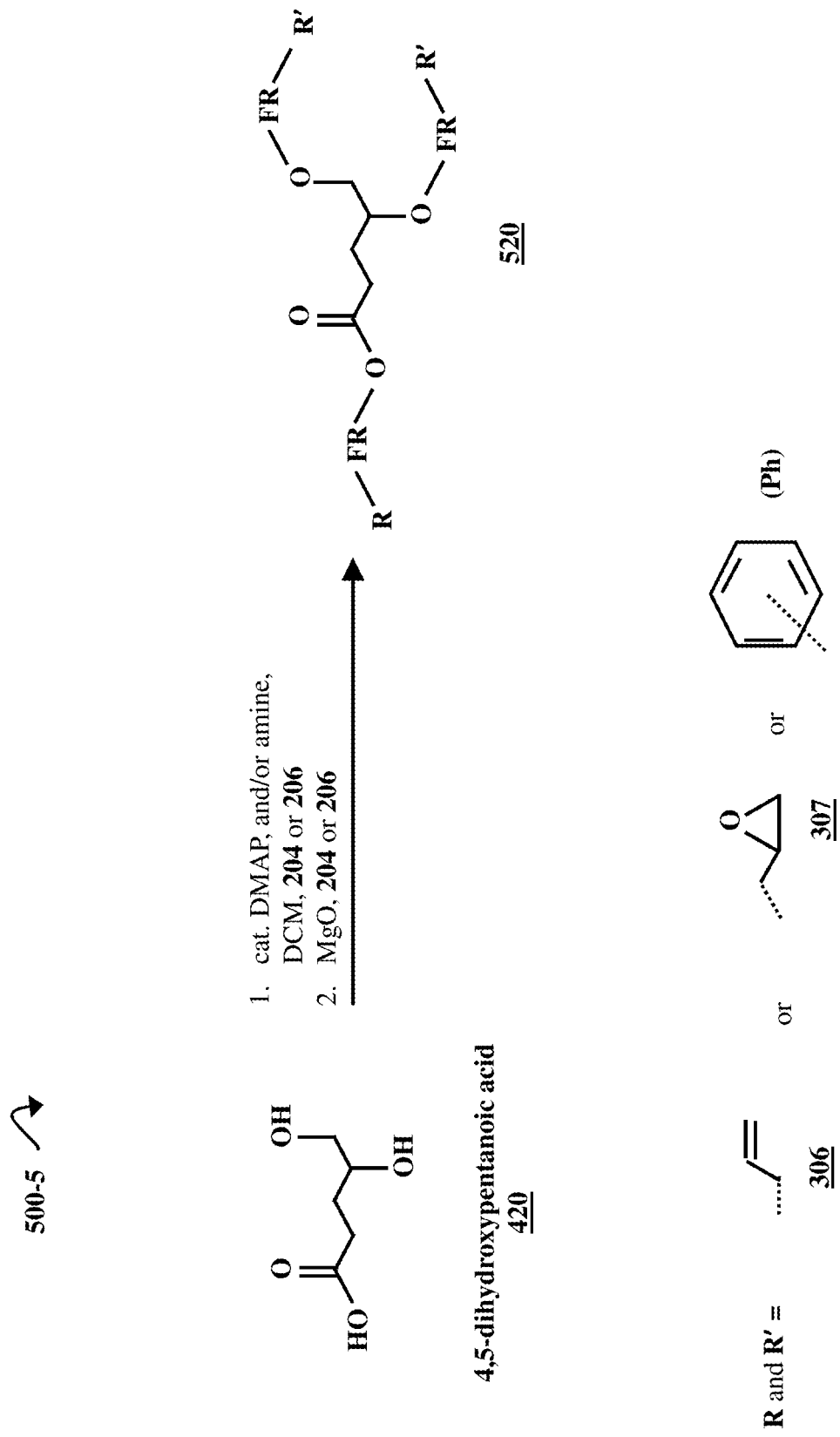
FIG. 5E is a chemical reaction diagram illustrating a process of forming R-functionalized and/or phenyl-substituted 4,5-dihydroxypentanoic acid-derived flame retardant compounds, according to some embodiments of the present disclosure.

FIG. 5E is a chemical reaction diagram illustrating a process 500-5 of forming R-functionalized and/or phenyl-substituted 4,5-dihydroxypentanoic acid-derived flame retardant compounds 520, according to some embodiments of the present disclosure. In this reaction, 4,5-dihydroxypentanoic acid 420 is reacted with a phosphorus-based flame-retardant molecule 204 or 206 in two steps. Carrying out the reaction in multiple steps with different phosphorus-based flame-retardant molecules 204 or 206 allows the formation of monofunctionalized, difunctionalized, trifunctionalized, or phenyl-substituted 4,5-dihydroxypentanoic acid-derived flame retardant compounds 520. In the first step, FR moieties with functional groups or phenyl (Ph) substituents represented by R' are added at the locations of the hydroxyl groups, and in the second step, an FR moiety with a functional group or phenyl (Ph) substituent represented by R is added at the location of the carboxylic acid group.

In the first step, the selected phosphorus-based flame-retardant molecule 204 or 206 is reacted with 4,5-dihydroxypentanoic acid 420 and catalytic dimethylaminopyridine (cat. DMAP) and/or a stoichiometric amount of an organic amine (such as triethylamine (NEt$_3$)), in a dichloromethane (DCM) solution. These reaction conditions cause the phosphorus-based flame retardant molecule 204 or 206 to react with the hydroxyl groups on 4,5-dihydroxypentanoic acid 420, and attach FR moieties. In the second step, the selected phosphorus-based flame-retardant molecule 204 or 206 is reacted with the product from the first step and magnesium oxide. These reaction conditions cause the phosphorus-based flame retardant molecule 204 or 206 to react with the carboxylic acid group on 4,5-dihydroxypentanoic acid 420, and attach an FR moiety. Carrying out the syntheses of the 4,5-dihydroxypentanoic acid-derived flame retardant compounds 520 in multiple steps allows the identity of the R and R' groups and the degree of functionality to be varied.

For example, if steps one and two are both carried out with a phenyl-substituted phosphorus-based flame retardant molecule 206, compound 520 will be a phenyl-substituted flame retardant small molecule that can be blended with materials such as polymers to impart flame retardancy. Further, if steps one and two are both carried out with an R-functionalized flame-retardant phosphorus-based molecule 204, compound 520 will be a trifunctionalized flame retardant compound that can be a cross-linker in a polymer, or it can be polymerized to form a flame retardant polymer. The functional R or R' groups on the phosphorus-based molecule 204 can be varied between steps one and two, yielding a trifunctionalized compound with different types of functional groups (e.g., one allyl R group 306 and two epoxy R' groups 307).

In some embodiments, varying the R and R' groups on the 4,5-dihydroxypentanoic acid-derived flame retardant compound 520 can result in compounds with different degrees of functionality. For example, if step one is carried out with an R-functionalized phosphorus-based flame retardant molecule 204, and step two is carried out with a phenyl-substituted phosphorus-based flame retardant molecule 206, compound 520 will be a difunctionalized flame retardant compound where the R' groups are each an allyl 306 or epoxy 307 functional group (depending on the choice of R group on compound 204), and where the R group is a phenyl substituent. Like a trifunctionalized compound 520, a difunctionalized flame retardant compound 520 can be a cross-linker, or it can be polymerized. Further, carrying out step one with a phenyl-substituted phosphorus-based flame retardant molecule 206, and step two with an R-functionalized phosphorus-based flame retardant molecule 204, yields a monofunctionalized flame retardant compound 520. Monofunctionalized flame retardant compounds 520 can be polymerized, or bound to polymer chains, causing the polymer to be flame retardant.

Figure 5F:
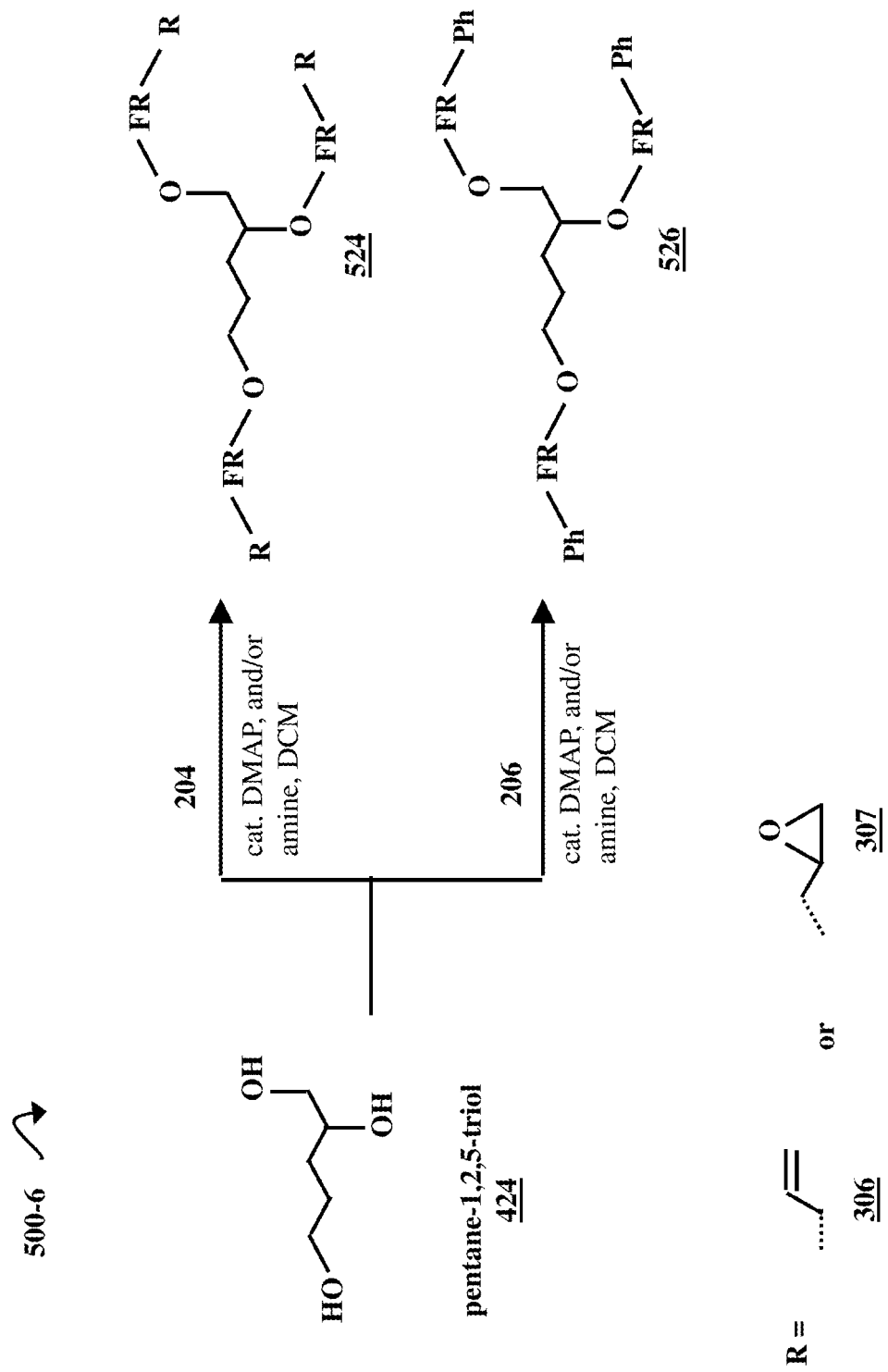
FIG. 5F is a chemical reaction diagram illustrating a process of forming a trifunctionalized pentane-1,2,5-triol-derived flame retardant compound and a phenyl-substituted pentane-1,2,5-triol-derived flame retardant compound, according to some embodiments of the present disclosure.

FIG. 5F is a chemical reaction diagram illustrating a process 500-6 of forming a trifunctionalized pentane-1,2,5-triol-derived flame retardant compound 524 and a phenyl-substituted pentane-1,2,5-triol-derived flame retardant compound 526, according to some embodiments of the present disclosure. In both reactions, pentane-1,2,5-triol 424 is reacted with a phosphorus-based flame-retardant molecule 204 or 206 and catalytic dimethylaminopyridine (cat. DMAP) and/or a stoichiometric amount of an organic amine (such as triethylamine ($NEt_3$)), in a dichloromethane (DCM) solution. When the reaction is carried out with an R-functionalized phosphorus-based compound 204, allyl-306 or epoxy-307 functionalized FR moieties are attached at the hydroxyl groups on pentane-1,2,5-triol 424. This reaction forms the trifunctionalized pentane-1,2,5-triol-derived flame retardant compound 524. This compound 524 is a flame retardant levulinic acid-based compound that can be polymerized or act as a cross-linker in another polymer. Its inclusion in a polymer, either as a monomer or a cross-linker, causes the polymer to be flame retardant.

If process 500-6 is carried out with a phenyl-substituted phosphorus-based compound 206, phenyl-substituted FR moieties are attached at the hydroxyl groups, and the phenyl-substituted pentane-1,2,5-triol-derived flame retardant compound 526 is formed. This compound 526 is a flame retardant levulinic acid-based small molecule, which can be blended with a polymer to impart flame retardancy.

Figure 5G:
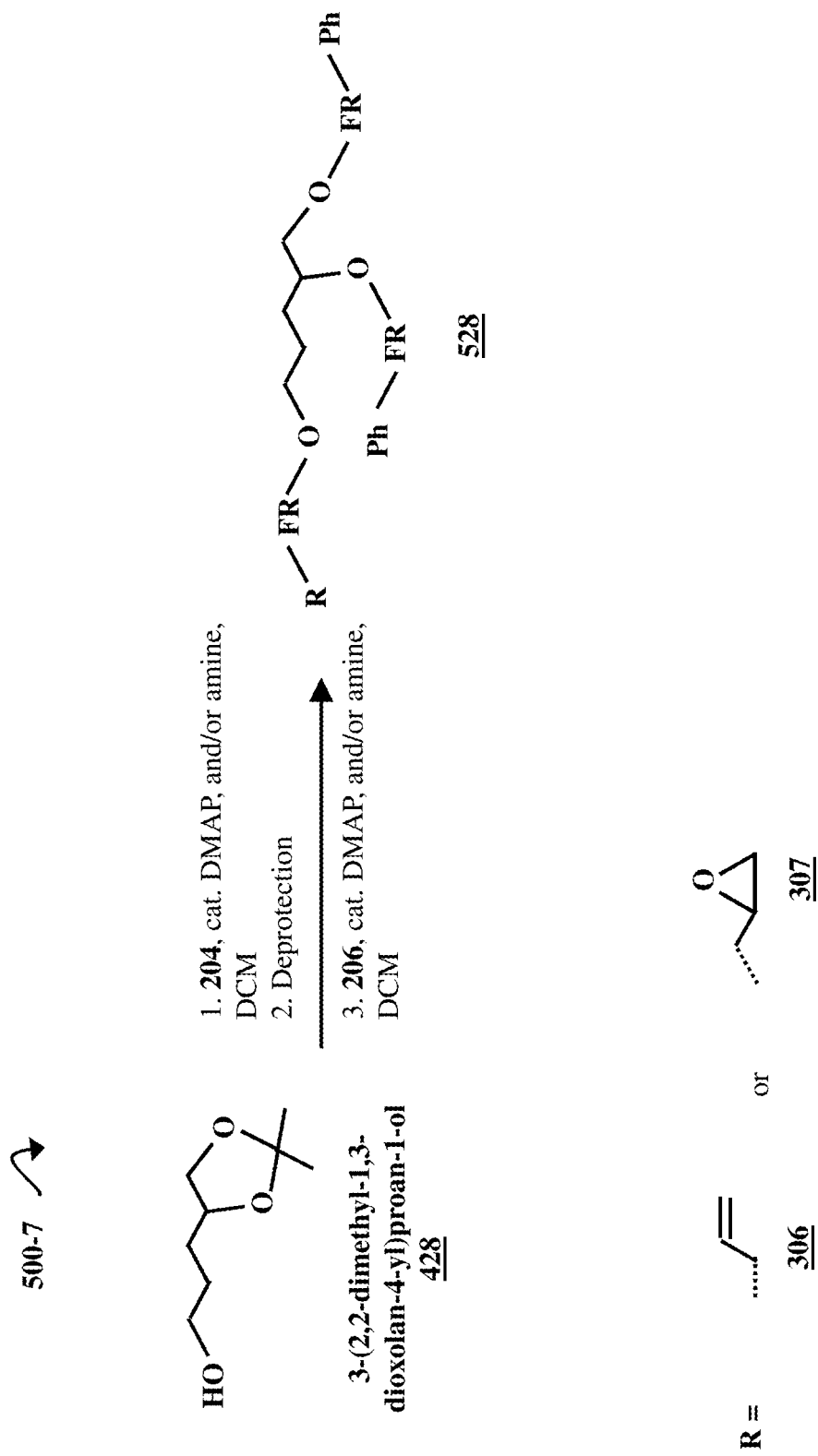
FIG. 5G is a chemical reaction diagram illustrating a process of forming a monofunctionalized 3-(2,2-dimethyl-1,3-dioxolan-4-yl)propan-1-ol-derived flame retardant compound, according to some embodiments of the present disclosure.

FIG. 5G is a chemical reaction diagram illustrating a process 500-7 of forming a monofunctionalized 3-(2,2-dimethyl-1,3-dioxolan-4-yl)propan-1-ol-derived flame retardant compound 528, according to some embodiments of the present disclosure. Process 500-7 is carried out in three steps. In the first step, levulinic acid-derived 3-(2,2-dimethyl-1,3-dioxolan-4-yl)propan-1-ol 428 is reacted with an R-functionalized phosphorus-based compound 204 and catalytic dimethylaminopyridine (cat. DMAP) and/or a stoichiometric amount of an organic amine (such as triethylamine ($NEt_3$)), in dichloromethane (DCM). This step attaches an R-functionalized FR moiety at the hydroxyl group on 3-(2,2-dimethyl-1,3-dioxolan-4-yl)propan-1-ol 428.

The second step is a deprotection reaction. This step is a ring-opening deprotection reaction using an acid such as p-toluenesulfonic acid (p-TsOH) or hydrochloric acid (HCl). The addition of the acid to the reaction mixture exposes two hydroxyl groups, which are then reacted in the third step with a phenyl-substituted phosphorus-based compound 206 and cat. DMAP and/or a stoichiometric amount of an organic amine (such as triethylamine ($NEt_3$)), in DCM. The third step attaches phenyl-substituted FR moieties to the newly exposed hydroxyl groups, and forms the monofunctionalized 3-(2,2-dimethyl-1,3-dioxolan-4-yl)propan-1-ol-derived flame retardant compound 528. In some embodiments, the phenyl-substituted flame retardant phosphorus-based compound 206 could be used in step one and the R-functionalized flame retardant phosphorus based compound 204 could be used in step two, producing a difunctionalized compound.

Figure 5H:
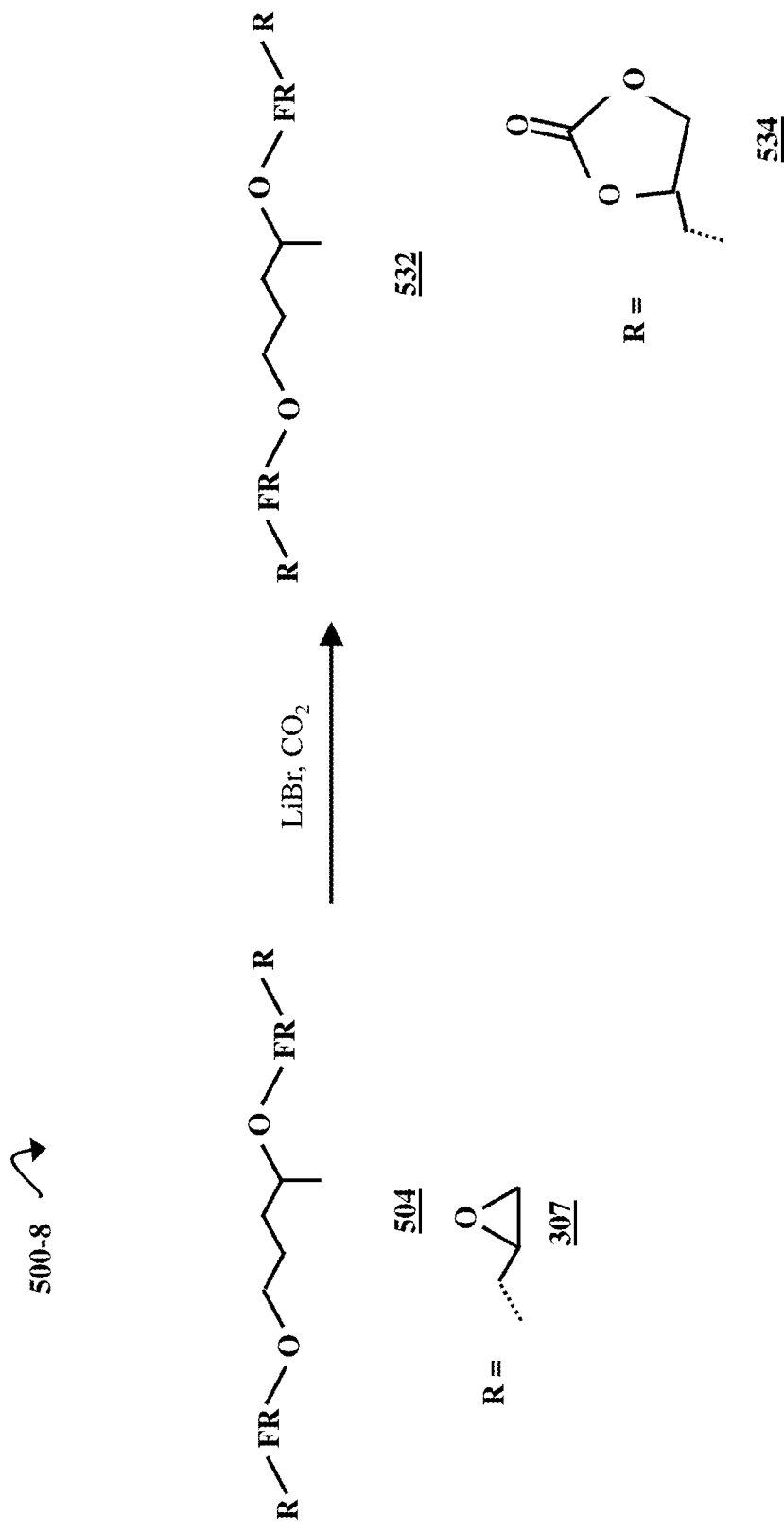
FIG. 5H is a chemical reaction diagram illustrating a process of forming a propylene carbonate-functionalized levulinic acid-based flame retardant compound, according to some embodiments of the present disclosure.

FIG. 5H is a chemical reaction diagram illustrating a process 500-8 of forming a propylene carbonate-functionalized levulinic acid-based flame retardant compound 532, according to some embodiments of the present disclosure. In this reaction, the difunctionalized levulinic acid-based flame retardant compound 504 having epoxy R groups 307 is combined with lithium bromide (LiBr). Carbon dioxide ($CO_2$) is added to the mixture, yielding the propylene carbonate-functionalized flame retardant levulinic acid-based compound 532. It should be noted that the reaction between the epoxy R groups 307, LiBr, and $CO_2$ can be carried out with any of the epoxy-functionalized compounds disclosed herein, including epoxy-functionalized versions of 508, 512, 516, 520, 524, and 528. This reaction converts any epoxy R groups 307 to propylene carbonate R groups 534.

Figure 6A:
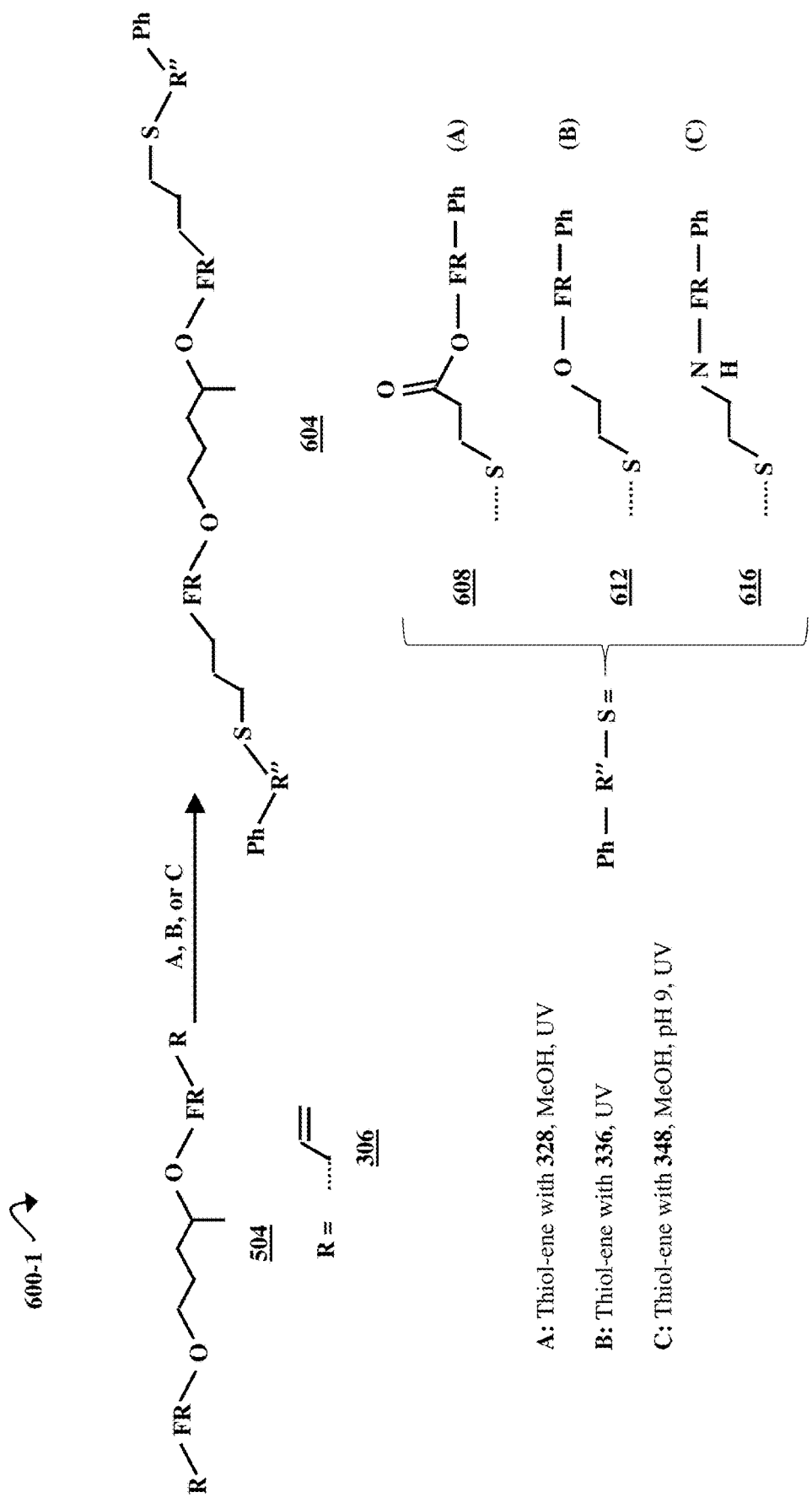
FIG. 6A is a chemical reaction diagram illustrating a process of forming phenyl-substituted thioether-linked flame retardant pentane-1,4-diol-based compounds, according to some embodiments of the present disclosure.

FIG. 6A is a chemical reaction diagram illustrating a process 600-1 of forming phenyl-substituted thioether-linked flame retardant pentane-1,4-diol-based compounds 604, according to some embodiments of the present disclosure. The process 600-1 can be carried out under reaction conditions A, B, or C. Each of these reaction conditions is a thiol-ene reaction between the difunctionalized levulinic acid-based flame retardant compound 504 having allyl R groups 306 and a phenyl-substituted flame retardant thiol molecule 328, 336, or 348. Each thiol molecule binds to an allyl group on the pentane-1,4-diol-based precursor 504. The syntheses and structures of the phenyl-substituted flame retardant thiol molecules are discussed in greater detail with regard to FIGS. 3C and 3D. The thiols provide phenyl-substituted thioether groups, which are also referred to "Ph-R"-S" groups herein. The phenyl-substituted Ph-R"-S- linked flame-retardant levulinic acid-based compounds 604 can be blended with polymers to impart flame retardancy.

Under thiol-ene reaction conditions A, the difunctionalized pentane-1,4-diol-based flame retardant compound 504 having allyl R groups 306 is reacted with the phenyl-substituted carboxylic acid-derived flame-retardant thiol molecule 328 under UV light in a methanol (MeOH) solution. The resulting Ph-R"-S-linked flame-retardant levulinic acid-based compound 604 has thioether groups 608 that correspond to the carboxylic acid-derived flame-retardant thiol molecule 328.

Under thiol-ene reaction conditions B, the difunctionalized pentane-1,4-diol-based flame retardant compound 504 having allyl R groups 306 is reacted with the phenyl-substituted hydroxy-derived flame retardant thiol molecule 336 under UV light. The resulting Ph-R"-S-linked flame-retardant levulinic acid-based compound 604 has thioether groups 612 that correspond to the hydroxy-derived flame retardant thiol molecule 336.

Under thiol-ene reaction conditions C, the difunctionalized pentane-1,4-diol-based flame retardant compound 504 having allyl R groups 306 is reacted with the phenyl-substituted amine-derived flame retardant thiol molecule 348 under UV light in a pH 9 methanol solution. The resulting Ph-R"-S-linked flame-retardant levulinic acid-based compound 604 has thioether groups 616 that correspond to the amine-derived flame retardant thiol molecule 348.

Figure 6B:
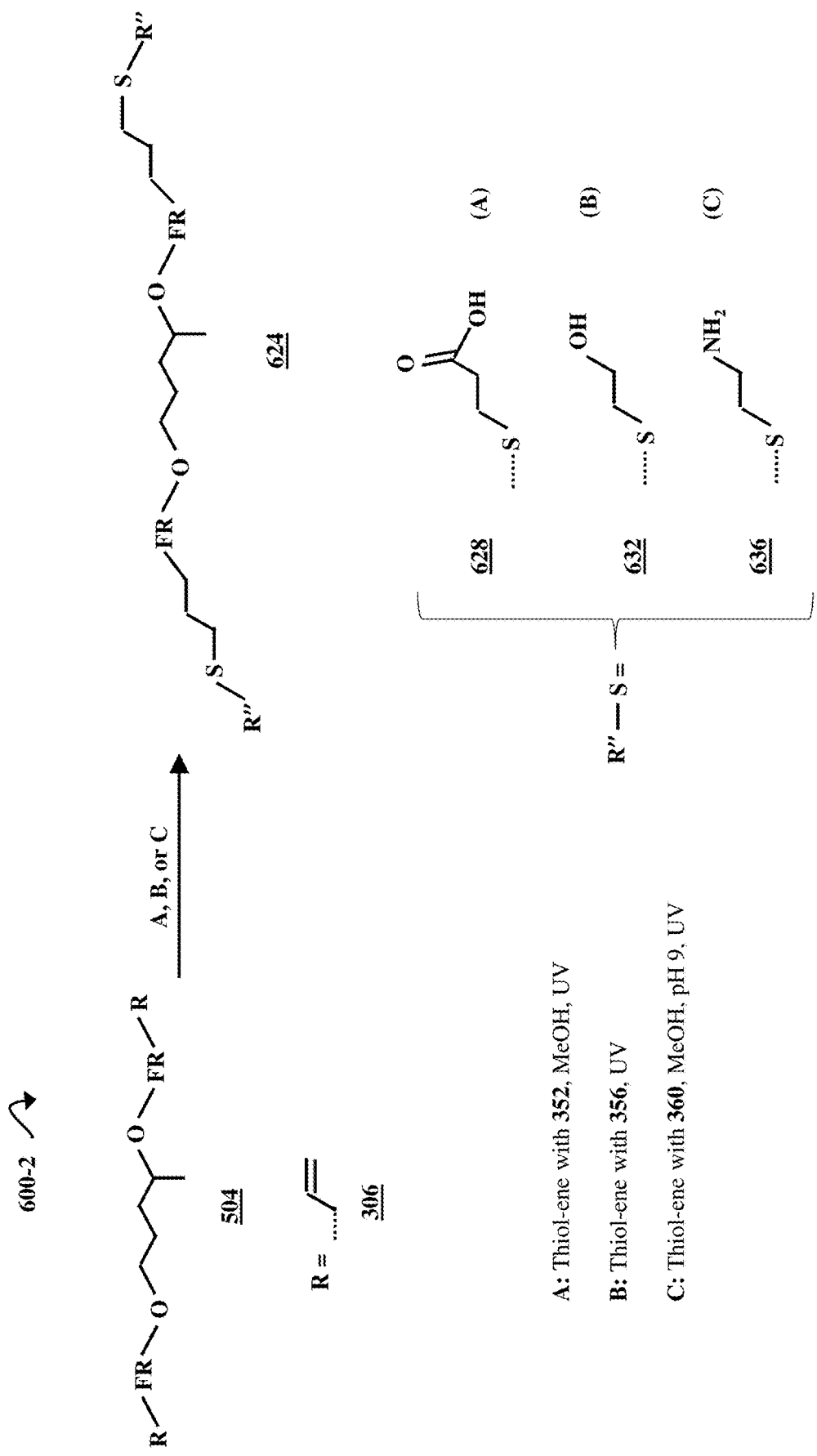
FIG. 6B is a chemical reaction diagram illustrating a process of forming difunctionalized thioether-linked flame retardant pentane-1,4-diol-based compounds, according to some embodiments of the present disclosure.

FIG. 6B is a chemical reaction diagram illustrating a process 600-2 of forming difunctionalized thioether-linked flame retardant pentane-1,4-diol-based compounds 624, according to some embodiments of the present disclosure. The process 600-2 is carried out under reaction conditions A, B, or C. Each of these reaction conditions is a thiol-ene reaction between the difunctionalized pentane-1,4-diol-based flame retardant compound 504 having allyl R groups 306 and a thiol molecule, which can be 3-mercaptopropionate 352, 2-mercaptoethanol 356, or cysteamine hydrochloride (HCl) 360. The thiols provide R"-functionalized thioether groups, which are also referred to "R"-S" groups herein. Each thiol molecule reacts with an allyl group on the pentane-1,4-diol-based precursor 504, forming difunctionalized thioether-linked levulinic acid-based compounds 624. These compounds 624 can bind to polymers, and act as cross-linkers, causing the polymers to be flame retardant.

Under thiol-ene reaction conditions A, the difunctionalized pentane-1,4-diol-based flame retardant compound 504 having allyl R groups 306 is reacted with 3-mercaptopropionate 352 under UV light in a methanol (MeOH) solution. The resulting R"-S-linked flame-retardant levulinic acid-based compound 624 has thioether groups 628 that correspond to the 3-mercaptopropionate 352. Under thiol-ene reaction conditions B, the difunctionalized pentane-1,4-diol-based flame retardant compound 504 having allyl 306 R groups is reacted with 2-mercaptoethanol 356 under UV light. The resulting R"-S-linked flame-retardant levulinic acid-based compound 624 has thioether groups 632 that correspond to the 2-mercaptoethanol 356. Under thiol-ene reaction conditions C, the difunctionalized pentane-1,4-diol-based flame retardant compound 504 having allyl R groups 306 is reacted with cysteamine HCl 360 under UV light in a pH 9 methanol solution. The resulting R"-S-linked flame-retardant levulinic acid-based compound 624 has thioether groups 636 that correspond to the cysteamine HCl 360.

The reactions 600-1 and 600-2 between the allyl R groups 306 on the difunctionalized pentane-1,4-diol-based flame retardant compound 504 and the thiol molecules 328, 336, 348, 352, 356, or 360 can be carried out with any of the allyl-functionalized compounds disclosed herein, including allyl-functionalized versions of 508, 512, 516, 520, 524, and 528. The reactions attach the corresponding thioether groups 608, 612, 616, 628, 632, or 636 at the locations of the allyl functional groups. This can result in different degrees of functionalization, which is illustrated in the examples of FIGS. 6C and 6D.

Figure 6C:
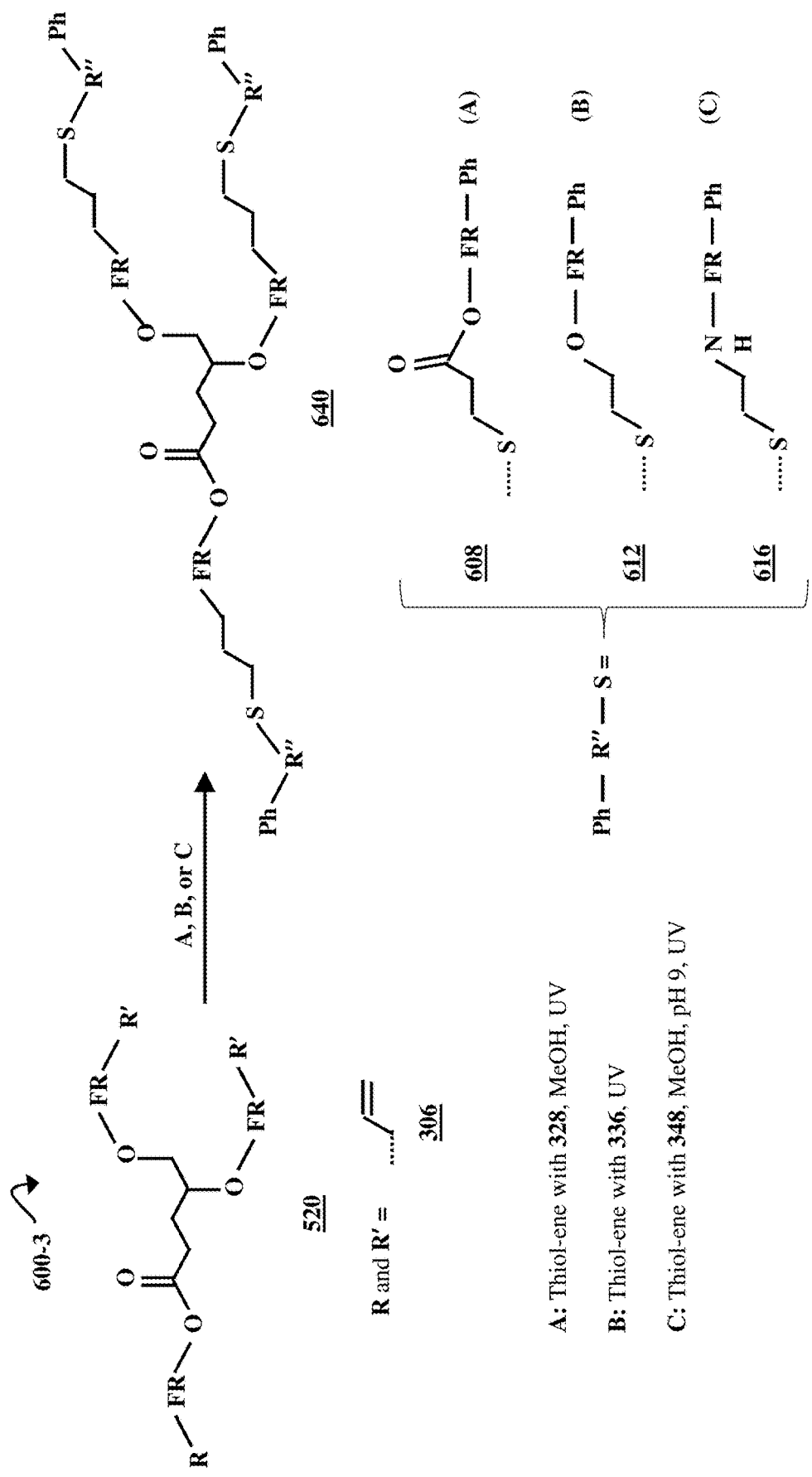
FIG. 6C is a chemical reaction diagram illustrating a process of forming phenyl-substituted thioether-linked flame retardant 4,5-dihydroxypentanoic acid-derived compounds, according to some embodiments of the present disclosure.

FIG. 6C is a chemical reaction diagram illustrating a process 600-3 of forming phenyl-substituted thioether-linked flame retardant 4,5-dihydroxypentanoic acid-derived flame retardant compounds 640, according to some embodiments of the present disclosure. The process 600-3 is carried out under reaction conditions A, B, or C. These reaction conditions are substantially similar to those described with respect to process 600-1 in FIG. 6A. Each reaction is a thiol-ene reaction between the trifunctionalized 4,5-dihydroxypentanoic acid-derived flame retardant compound 520 having allyl R and R' groups 306 and a phenyl-substituted flame retardant thiol molecule 328, 336, or 348. Each thiol molecule binds to an allyl group on the 4,5-dihydroxypentanoic acid-derived precursor 520. The resulting phenyl-substituted Ph-R"-S-linked flame-retardant 4,5-dihydroxypentanoic acid-derived flame retardant compounds 640 can be blended with polymers to impart flame retardancy. Varying different degrees of functionalization can result from performing process 600-3 using a 4,5-dihydroxypentanoic acid-derived precursor 520 with an allyl R group 306 and non-allyl R' groups (such as phenyl groups), or vice versa (a 4,5-dihydroxypentanoic acid-derived precursor 520 with a non-allyl R group (such as phenyl groups) and allyl R' groups 306). Accordingly, the thiol-ene reaction will occur only at the allyl R group 306 and not the non-allyl R' groups, or vice versa (at the allyl R' groups 306, and not at the non-allyl R group). Variations of process 600-3 can yield resulting Ph-R"-S-linked flame-retardant levulinic acid-based compounds 620 with one, two, or three of thioether groups 608, 612, or 616 corresponding to the number of allyl groups present in precursor 520 (based on the identities of the R and R' groups).

Figure 6D:
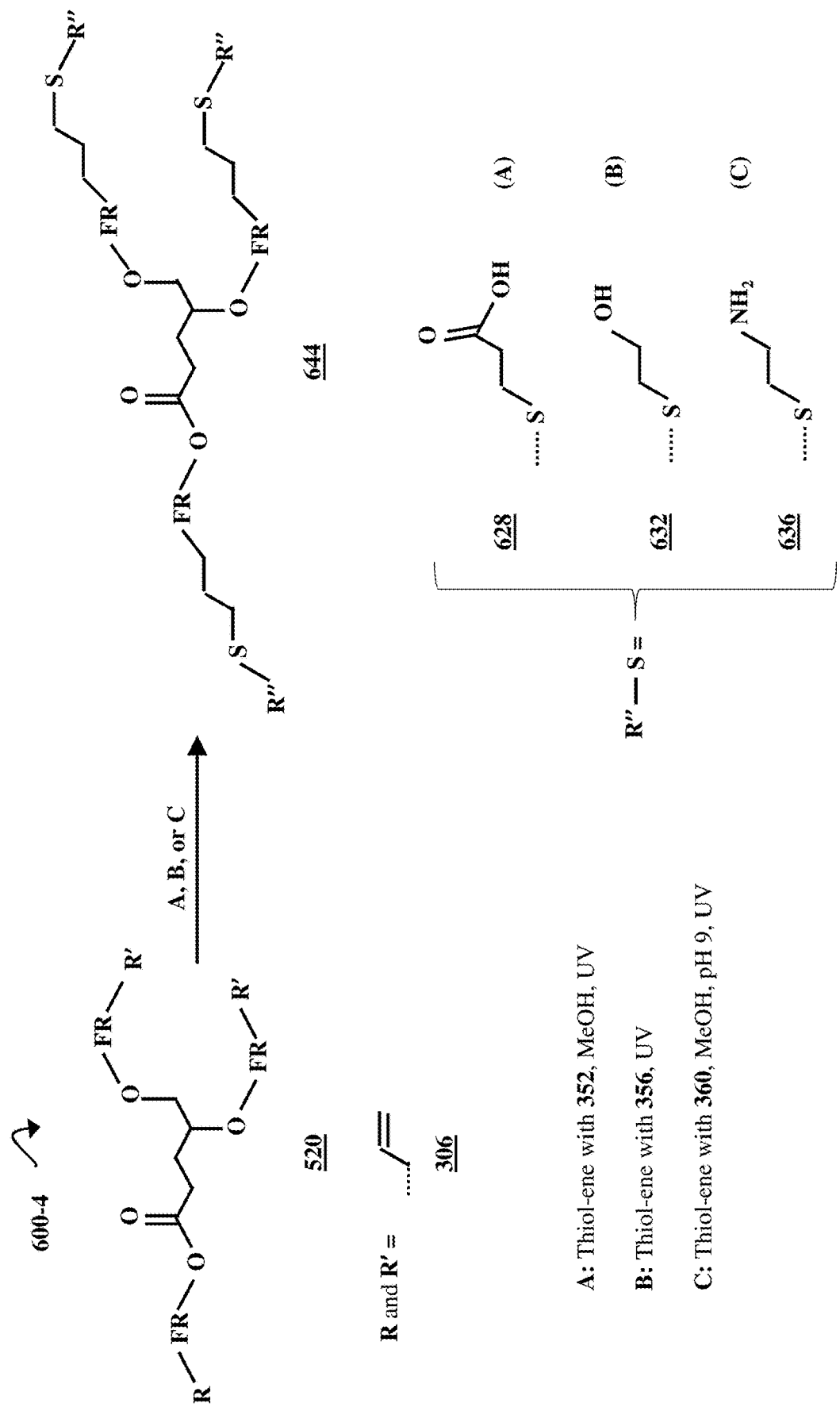
FIG. 6D is a chemical reaction diagram illustrating a process of forming trifunctionalized thioether-linked flame retardant 4,5-dihydroxypentanoic acid-derived compounds, according to some embodiments of the present disclosure.

FIG. 6D is a chemical reaction diagram illustrating a process 600-4 of forming trifunctionalized thioether-linked flame retardant 4,5-dihydroxypentanoic acid-derived compounds 644, according to some embodiments of the present disclosure. The process 600-4 is carried out under reaction conditions A, B, or C. These reaction conditions are substantially similar to those described with respect to process 600-2 in FIG. 6B. Each reaction is a thiol-ene reaction between the trifunctionalized 4,5-dihydroxypentanoic acid-derived flame retardant compound 520 having allyl R and R' groups 306 and a thiol molecule, which can be 3-mercaptopropionate 352, 2-mercaptoethanol 356, or cysteamine hydrochloride (HCl) 360. Each thiol molecule reacts with an allyl group on the 4,5-dihydroxypentanoic acid-derived precursor 520, forming trifunctionalized thioether-linked 4,5-dihydroxypentanoic acid-derived compounds 644. These compounds 644 can bind to polymers, and act as cross-linkers, causing the polymers to be flame retardant. Varying different degrees of functionalization can result from performing process 600-4 using a 4,5-dihydroxypentanoic acid-derived precursor 520 with an allyl R group 306 and non-allyl R' groups (such as phenyl groups), or vice versa (a 4,5-dihydroxypentanoic acid-derived precursor 520 with a non-allyl R group (such as phenyl groups) and allyl R' groups 306). Accordingly, the thiol-ene reaction will occur only at the allyl R group 306 and not the non-allyl R' groups, or vice versa (at the allyl R' groups 306 and not at the non-allyl R group). Variations of process 600-4 can yield resulting R"-S-linked flame-retardant levulinic acid-based compounds 644 with one, two, or three of thioether groups 628, 632, or 636 corresponding to the number of allyl groups present in precursor 520 (based on the identities of the R and R' groups).

The processes of forming the flame retardant levulinic acid-based compounds illustrated herein can be carried out with different combinations of phosphorus-based flame retardant molecules 204 and 206. In some embodiments, these processes can be carried out with either all phosphate-based flame retardant molecules (204-1 and/or 206-1) or all phosphonate-based flame retardant molecules (204-2 and/or 206-2). In other embodiments, a mixture of both phosphate-phosphonate-based flame retardant molecules can be used. Carrying out these processes with a mixture of phosphate- and phosphonate-based molecules (206-1/206-2 and/or 204-1/204-2) can result in the production of flame retardant levulinic acid-based monomers with both phosphoryl and phosphonyl FR groups.

However, in some instances, adding a mixture of phosphate- and phosphonate-based molecules (206-1/206-2 or 204-1/204-2) can result in the production of flame retardant levulinic acid-based monomers with all phosphoryl or all phosphonyl FR moieties. Additionally, adding a mixture of phosphate- and phosphonate-based molecules (206-1/206-2 or 204-1/204-2) to the reaction can yield a mixture of products that includes some combination of flame retardant levulinic acid-based monomers with either all phosphoryl or all phosphonyl FR groups and flame retardant levulinic acid-based monomers with both phosphoryl and phosphonyl FR groups.

Figure 7A:
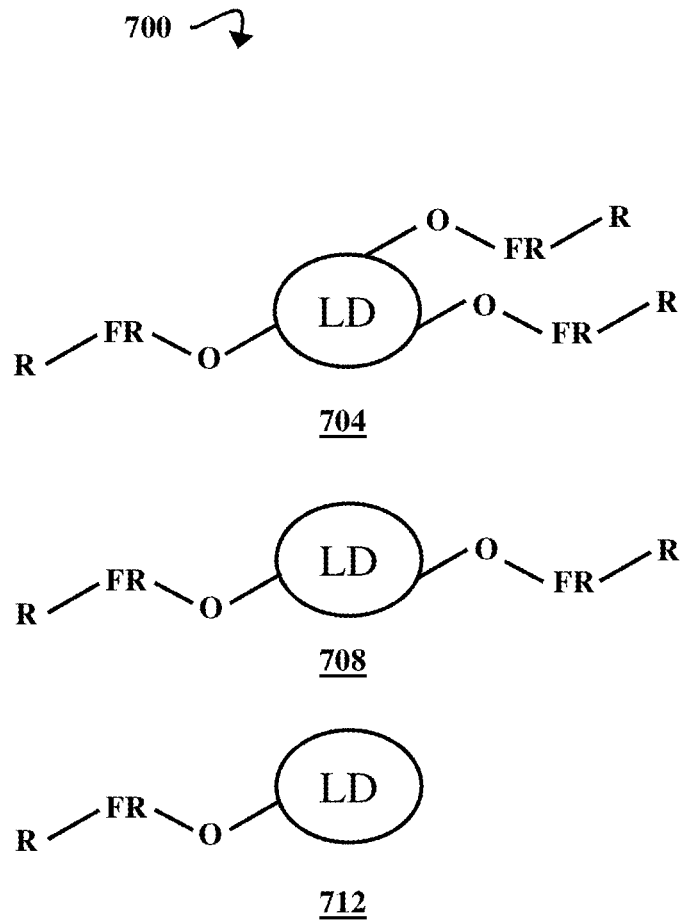
FIG. 7A is a diagrammatic representation of the structures of generic R-functionalized levulinic acid-based flame retardant monomers, according to some embodiments of the present disclosure.

FIG. 7A is a diagrammatic representation of the structures 700 of generic R-functionalized levulinic acid-based flame retardant monomers 704, 708, and 712, according to some embodiments of the present disclosure. The monomers are trifunctionalized flame retardant levulinic acid-based compounds 704 (e.g., compounds 520 and 524), difunctionalized flame retardant levulinic acid-based compounds 708 (e.g., compounds 504, 508, 516, 528, and 532), and monofunctionalized flame retardant levulinic acid-based compounds 712 (e.g., compounds 512 and 528). Examples of compounds represented by these structures 700 are discussed in greater detail with respect to FIGS. 5A-5H. The R-functionalized levulinic acid-based compounds 700 can be polymerized to form flame retardant levulinic acid-based polymers. Each structure shows only the ligands with R functional groups (e.g., allyl, epoxy, or propylene carbonate). An oval labeled "LD" represents the levulinic acid-derivative core of each monomer.

Figure 7B:
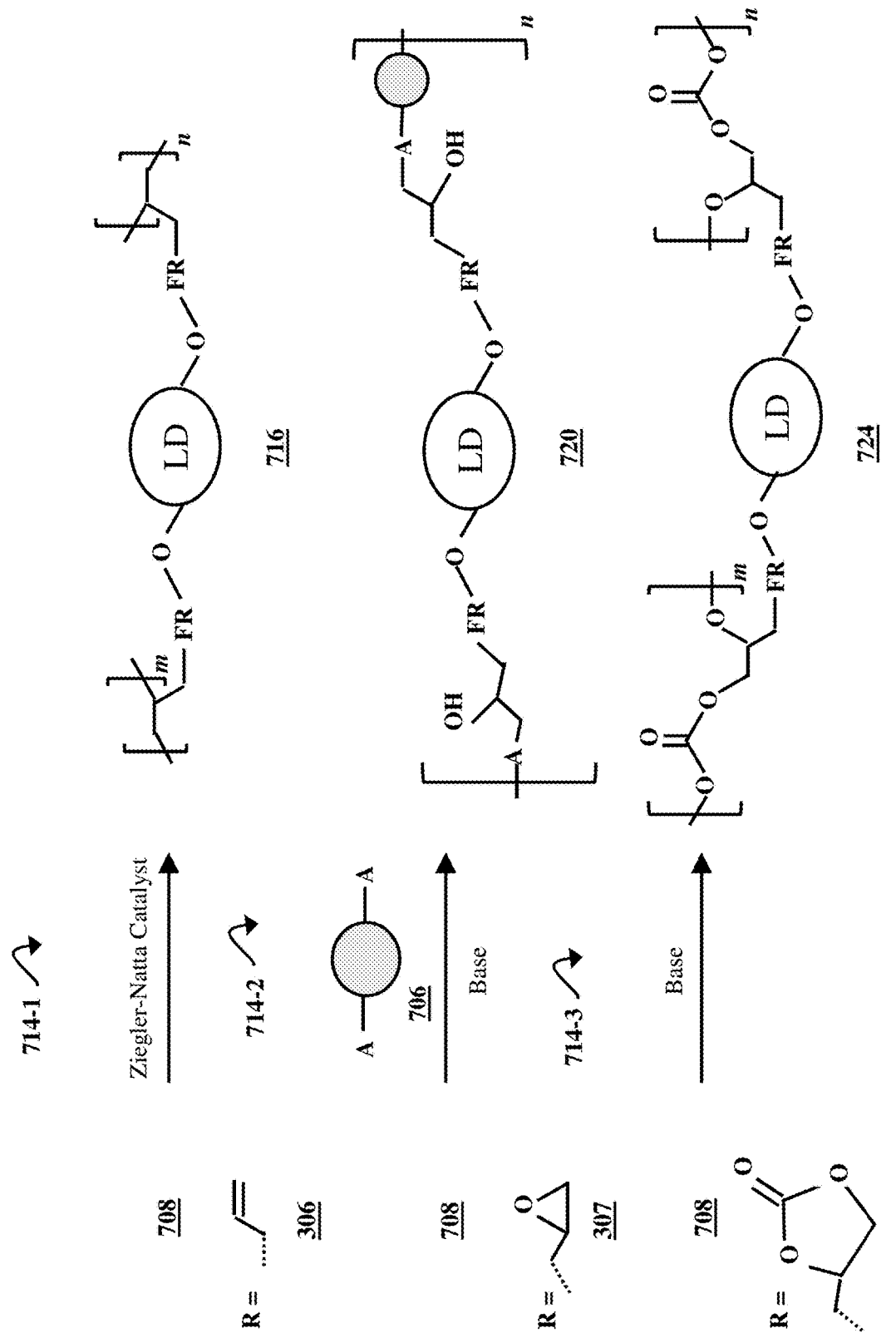
FIG. 7B is a chemical reaction diagram illustrating processes of synthesizing flame retardant levulinic acid-based polymers from flame retardant levulinic acid-based compounds, according to some embodiments of the present disclosure.

FIG. 7B is a chemical reaction diagram illustrating processes 714-1, 714-2, and 714-3 of synthesizing flame retardant levulinic acid-based polymers 716, 720, and 724 from flame retardant levulinic acid-based compounds, according to some embodiments of the present disclosure. The reactions illustrated herein are prophetic examples of polymers that can be synthesized from the flame retardant levulinic acid-based monomers, but other polymers can be produced as well (e.g., by changing reaction conditions, co-monomers, R groups, etc.).

Processes 714-1-714-3 illustrate the polymerization of difunctionalized flame retardant levulinic acid-based monomers 708 only. However, it should be noted that each of these polymerization reactions can also be carried out with the trifunctionalized flame retardant levulinic acid-based monomers 704. Additionally, processes 714-1 and 714-3 can be carried out with the monofunctionalized flame retardant levulinic acid-based monomers 712. Further, in some embodiments, the polymerization reactions are carried out with a combination of both difunctionalized flame retardant levulinic acid-based monomers 708 and trifunctionalized flame retardant levulinic acid-based monomers 704, both difunctionalized flame retardant levulinic acid-based monomers 708 and monofunctionalized flame retardant levulinic acid-based monomers 712, both trifunctionalized flame retardant levulinic acid-based monomers 704 and monofunctionalized flame retardant levulinic acid-based monomers 712, or a combination of monomers that includes tri-, di-, and monofunctionalized monomers in any ratio.

In process 714-1, allyl-derived flame retardant levulinic acid-based polymers 716 are formed from difunctionalized flame retardant levulinic acid-based compounds 708 having allyl R groups 306. The difunctionalized flame retardant levulinic acid-based compound 708 is reacted with a Ziegler-Natta catalyst. Ziegler-Natta catalysts catalyze the polymerization of 1-alkenes. Examples of these catalysts can include heterogeneous Ziegler-Natta catalysts based on titanium compounds and homogeneous Ziegler-Natta catalysts based on complexes of titanium, zirconium, or hafnium. Heterogeneous and homogeneous Ziegler-Natta catalysts can be used in combination with organoaluminum co-catalysts in some embodiments.

In process 714-2, epoxy-derived flame retardant levulinic acid-based polymers 720 are formed from difunctionalized flame retardant levulinic acid-based monomers 708 having epoxy R groups 307. The difunctionalized flame retardant levulinic acid-based compound 708 is reacted with a base and a second monomer 706. The second monomer 706 is a compound with at least two hydroxyl (OH) groups or at least two amino (NH$_2$) groups (e.g., a diol, polyol, diamine, polyamine, etc.). These compounds 706 are illustrated as a gray oval with attached A groups. The A group represents a hydroxyl group or an amino group. It should be noted that, while two A groups are illustrated herein, there are more than two A groups in some embodiments. In some embodiments, compounds 706 can be diol or diamine versions of difunctionalized thioether-linked flame retardant pentane-1, 4-diol-based compounds 624; diol, polyol, diamine, or polyamine versions of trifunctionalized thioether-linked flame retardant 4,5-dihydroxypentanoic acid-derived compounds 644; or other diol, polyol, diamine, or polyamine thioether-linked flame retardant levulinic acid derivatives. Additionally, in some embodiments, the difunctionalized levulinic acid-based compound 708 having epoxy R groups 307 self-polymerizes under basic conditions. In these instances, the reaction does not include the second monomer 706.

In process 714-3, propylene carbonate-derived flame retardant levulinic acid-based polymers 724 are formed from difunctionalized flame retardant levulinic acid-based monomers having propylene carbonate R groups 529. The difunctionalized flame retardant levulinic acid-based monomer 708 having propylene carbonate R groups 529 is reacted in a ring-opening polymerization initiated by a base. Examples of bases that can be used as initiators can include potassium hydroxide (KOH), sodium hydroxide (NaOH), lithium hydroxide (LiOH), 1,8-diazabicyclo(5.4.0)undec-7-ene (DBU), triazabicyclodecene (TBD), etc.

In addition to the polymers illustrated in FIG. 7B, the flame retardant levulinic acid-based compounds disclosed herein can be used in the synthesis of other flame retardant polymers in some embodiments. An array of classes of flame retardant polymers can be made with different combinations of monomers. These polymerization processes are in accordance with polymer chemistry platforms that can include polyhydroxyurethanes, polycarbonates, polymers obtained by radical polymerization, polyurethanes, polyesters, polyacrylates, epoxy resins, polyimides, polyureas, polyamides, poly(vinyl-esters), etc.

One example of an application of polymers that incorporate flame retardant levulinic acid-based compounds is in plastics used in electronics hardware, such as integrated circuit packages. Additional applications can include acoustic dampening, cushioning, plastics, synthetic fibers, insulation, etc. The flame retardant levulinic acid-based compounds can also be used to make adhesives such as bio-adhesives, elastomers, thermoplastics, emulsions, thermosets, etc. Further, materials containing the flame retardant levulinic acid-based compounds can be incorporated into various devices with electronic components that can include printed circuit boards (PCBs), semiconductors, transistors, optoelectronics, capacitors, resistors, chip carriers, etc.

Resins for printed circuit boards (PCBs) can be made flame retardant by incorporating polymers that include levulinic acid-based flame retardant compounds. PCBs are electrical circuits that can be found in most types of electronic device, and they support and electronically connect electrical components in the device. PCBs are formed by etching a copper conductive layer laminated onto an insulating substrate. The insulating substrate can be a laminate comprising a resin and a fiber. Many resins in PCBs contain a polymer, such as an epoxy, a polyhydroxyurethane, a polycarbonate, a polyester, a polyacrylate, a polyimide, a polyamide, a polyurea, a poly(vinyl-ester), etc. Using polymers that incorporate the flame retardant levulinic acid-based compounds can prevent the PCB from catching fire when exposed to high temperature environments or electrical power overloads.

It should be noted that, in some embodiments, the compounds described herein can contain one or more chiral centers. These can include racemic mixtures, diastereomers, enantiomers, and mixtures containing one or more stereoisomer. Further, the disclosed compounds can encompass racemic forms of the compounds in addition to individual stereoisomers, as well as mixtures containing any of these.

The synthetic processes discussed herein and their accompanying drawings are not to be construed as limiting. One skilled in the art would recognize that a variety of synthetic reactions may be used that vary in reaction conditions, components, methods, etc., which ultimately generate one or both of flame retardant levulinic acid-based compounds and their corresponding polymer derivatives. In addition, the reaction conditions can optionally be changed over the course of a process. Further, in some embodiments, processes can be added or omitted while still remaining within the scope of the disclosure, as will be understood by a person of ordinary skill in the art.

What is claimed is:

1. A process of forming a flame retardant levulinic acid-based polymer, comprising:
    obtaining a phosphorus-based flame retardant compound, wherein the phosphorus-based flame retardant compound is selected from a group consisting of phosphorus-based compounds with formulas of:

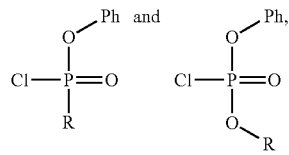

wherein R is selected from a group consisting of a phenyl substituent, an allyl functional group, and an epoxy functional group;
    forming a levulinic acid derivative, wherein the levulinic acid derivative comprises two or three hydroxyl groups;
    chemically reacting the levulinic acid derivative with the phosphorus-based flame retardant compound to form a levulinic acid-based flame retardant compound; and
    incorporating the flame retardant levulinic acid-based compound into a polymer to form the flame retardant levulinic acid-based polymer.

2. The process of claim 1, wherein the levulinic acid derivative is synthesized from levulinic acid that has been obtained from a bio-based source.

3. The process of claim 1, wherein the flame retardant levulinic acid-based compound is incorporated into the polymer by blending.

4. The process of claim 1, wherein the flame retardant levulinic acid-based compound is incorporated into the polymer by binding the flame retardant levulinic acid-based compound to one or more polymer chains.

5. The process of claim 1, wherein the flame retardant levulinic acid-based compound is incorporated into the polymer by a polymerization reaction.

6. The process of claim 5, wherein the polymerization reaction includes at least one additional monomer.

7. The process of claim 1, wherein the flame retardant levulinic acid-based compound has at least one functional group selected from a group consisting of the allyl group, the epoxy group, a propylene carbonate group, a carboxylic acid group, an amine group, and a hydroxyl group.

8. The process of claim 1, further comprising:
    reacting the levulinic acid-based flame retardant compound with thiol.

* * * * *